United States Patent
Jooste et al.

(10) Patent No.: US 10,728,224 B1
(45) Date of Patent: *Jul. 28, 2020

(54) TRANSMITTING SENSITIVE INFORMATION SECURELY OVER UNSECURED NETWORKS WITHOUT AUTHENTICATION

(71) Applicant: Verily Life Sciences LLC, South San Francisco, CA (US)

(72) Inventors: Sarel Kobus Jooste, Novato, CA (US); Jonathan Dixon, Sunnyvale, CA (US); Shane Alexander Farmer, San Francisco, CA (US); Patrick Lin Wheeler, San Jose, CA (US)

(73) Assignee: VERILY LIFE SCIENCES LLC, South San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/864,457

(22) Filed: Jan. 8, 2018

Related U.S. Application Data

(63) Continuation of application No. 14/485,300, filed on Sep. 12, 2014, now Pat. No. 9,900,287.

(51) Int. Cl.
  *H04L 29/06* (2006.01)
  *H04L 9/14* (2006.01)
  *H04L 9/08* (2006.01)

(52) U.S. Cl.
  CPC ........ *H04L 63/0428* (2013.01); *H04L 9/0861* (2013.01); *H04L 9/14* (2013.01)

(58) Field of Classification Search
  CPC ...... H04L 9/14; H04L 9/0861; H04L 63/0428
  (Continued)

(56) References Cited

U.S. PATENT DOCUMENTS 7,095,851 B1 * 8/2006 Scheidt ................ H04L 9/0841
  380/28
7,120,792 B1 * 10/2006 Jacobson ............... H04L 9/08
  713/153

(Continued)

OTHER PUBLICATIONS

U.S. Appl. No. 14/485,300, Final Office Action dated Jun. 24, 2016, 22 pages.

(Continued)

*Primary Examiner* — Eleni A Shiferaw
*Assistant Examiner* — Sakinah White Taylor
(74) *Attorney, Agent, or Firm* — Kilpatrick Townsend & Stockton LLP

(57) ABSTRACT

Methods and apparatus for encrypting and decrypting data for wearable devices that are not based on authentication techniques, such as login/password or handshaking, are provided. A computing device receives a message. The message includes encrypted data and a cryptographic reference. The encrypted data includes physiological data of a wearer of the wearable device. The cryptographic reference includes a reference to a first cryptographic technique. The computing device determines the first cryptographic technique based on the reference to the first cryptographic technique. The computing device determines a cryptographic key. The computing device decrypts the encrypted data using the first cryptographic technique and the cryptographic key to obtain decrypted data. The computing device stores the decrypted data.

20 Claims, 16 Drawing Sheets

(58) Field of Classification Search
USPC .......................................................... 713/150
See application file for complete search history.

(56) References Cited

U.S. PATENT DOCUMENTS

| | | | |
|---|---|---|---|
| 7,818,569 | B2 | 10/2010 | Devadas et al. |
| 7,921,294 | B2 | 4/2011 | Greco et al. |
| 8,538,021 | B2 | 9/2013 | Okuda |
| 8,774,403 | B2 | 7/2014 | MacMillan et al. |
| 8,834,366 | B2 | 9/2014 | Hayter et al. |
| 2008/0104417 | A1* | 5/2008 | Nachtigall ............ H04L 9/0822 713/193 |
| 2008/0310619 | A1 | 12/2008 | Scheidt et al. |
| 2009/0183008 | A1* | 7/2009 | Jobmann ................. G06F 21/34 713/186 |
| 2010/0046757 | A1 | 2/2010 | Dancer et al. |
| 2010/0250951 | A1 | 9/2010 | Ueno et al. |
| 2010/0254533 | A1* | 10/2010 | McCullough ......... H04W 12/04 380/44 |
| 2012/0131350 | A1* | 5/2012 | Atherton ............... H04L 9/3231 713/186 |
| 2012/0159194 | A1 | 6/2012 | Anderson |
| 2012/0317024 | A1 | 12/2012 | Rahman et al. |
| 2013/0142329 | A1 | 6/2013 | Bell et al. |
| 2013/0246813 | A1* | 9/2013 | Mori ................. G06F 17/30289 713/193 |
| 2015/0365361 | A1* | 12/2015 | Tomlinson ............. H04L 51/04 709/206 |

OTHER PUBLICATIONS

U.S. Appl. No. 14/485,300, Final Office Action dated May 26, 2017, 26 pages.
U.S. Appl. No. 14/485,300, Non-Final Office Action dated Nov. 4, 2015, 18 pages.
U.S. Appl. No. 14/485,300, Non-Final Office Action dated Oct. 31, 2016, 19 pages.
U.S. Appl. No. 14/485,300, Notice of Allowance dated Oct. 6, 2017, 15 pages.
Safenet Inc., An Introduction to Crypto Command Center and HSM Provisioning for the Cloud, Technical White Paper, 2013, pp. 1-7.

* cited by examiner

1100 Message
    1110 Cryptographic Reference
    1120 Message Data

FIGURE 11A

1110 Cryptographic Reference
    1130 Type Indicator
    1132 Type-Specific Reference
    1134 Reference Data

FIGURE 11B

1130 Cryptographic Type Indicator
    1140 Cryptographic-Algorithm Type
    1142 Cryptographic-Pattern Type
    1144 Cryptographic-Key Type
    1146 Cryptographic-General Data Type

FIGURE 11C

1150 Cryptographic-Algorithm Type-Specific Reference
    1152 01 = Algorithm 1 Specifier
    1154 02 = Algorithm 2 Specifier
    ….

FIGURE 11D

1160 Cryptographic-Pattern Type-Specific Reference
    1162 01 = Pattern 1 Specifier
    1164 02 = Pattern 2 Specifier
    ….

FIGURE 11E

```
1200 Message
    1210 Cryptographic Multi-Reference
    1220 Message Data
```

FIGURE 12A

```
1210 Cryptographic Multi-Reference
    1230 Reference Count RC
        1240 Reference 1 Size
        1242 Reference 1 Type Indicator
        1244 Reference 1 Type-Specific Reference
        1246 Reference 1 Data
        1250 Reference 2 Size
        1252 Reference 2 Type Indicator
        1254 Reference 2 Type-Specific Reference
        1256 Reference 2 Data
        ....
        1260 Reference RC Size
        1262 Reference RC Type Indicator
        1264 Reference RC Type-Specific Reference
        1266 Reference RC Data
```

TRANSMITTING SENSITIVE INFORMATION SECURELY OVER UNSECURED NETWORKS WITHOUT AUTHENTICATION

CROSS-REFERENCE TO RELATED APPLICATIONS

This application is a continuation of co-pending U.S. patent application Ser. No. 14/485,300, filed Aug. 25, 2015, entitled "Transmitting Sensitive Information Securely Over Unsecured Networks Without Authentication," the entirety of which is hereby incorporated by reference.

BACKGROUND

Unless otherwise indicated herein, the materials described in this section are not prior art to the claims in this application and are not admitted to be prior art by inclusion in this section.

Computing systems such as personal computers, laptop computers, tablet computers, cellular phones, and countless types of Internet-capable devices are prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." For example, some wearable computing devices are wrist-mounted devices that can be worn like a wrist watch.

Many wearable computing devices can store and communicate data about the wearable computing device, other objects, and/or other entities, such as a wearer of the wearable computing device. Once communicated, data from the wearable computing device can in turn be stored on one or more other computing devices.

SUMMARY

In one aspect, a method is provided. A computing device receives a message from a wearable device. The message includes encrypted data and a cryptographic reference. The encrypted data comprises physiological data of a wearer of the wearable device. The cryptographic reference includes a reference to a first cryptographic technique. The computing device determines the first cryptographic technique based on the reference to the first cryptographic technique. The computing device also determines a cryptographic key. The computing device decrypts the encrypted data using the first cryptographic technique and cryptographic key to obtain decrypted data. The computing device stores the decrypted data.

In another aspect, a computing device is provided. The computing device includes a processor and a non-transitory computer readable medium. The non-transitory computer readable medium is configured to store at least executable instructions. The executable instructions, when executed by the processor, cause the computing device to perform functions. The functions include: receiving a message from a wearable device, where the message includes (i) encrypted data that includes physiological data of a wearer of the wearable device, and (ii) a cryptographic reference that includes a reference to a first cryptographic technique; determining the first cryptographic technique based on the reference to the first cryptographic technique; determining a cryptographic key; decrypting the encrypted data using the first cryptographic technique and cryptographic key to obtain decrypted data; and storing the decrypted data.

In another aspect, a non-transitory computer readable medium is provided. The non-transitory computer readable medium is configured to store at least executable instructions. The executable instructions, when executed by a processor of a computing device, cause the computing device to perform functions. The functions include: receiving a message from a wearable device, where the message includes (i) encrypted data that includes physiological data of a wearer of the wearable device, and (ii) a cryptographic reference that includes a reference to a first cryptographic technique; determining the first cryptographic technique based on the reference to the first cryptographic technique; determining a cryptographic key; decrypting the encrypted data using the first cryptographic technique and cryptographic key to obtain decrypted data; and storing the decrypted data.

In another aspect, a computing device is provided. The computing device includes: means for receiving a message from a wearable device, where the message includes (i) encrypted data that includes physiological data of a wearer of the wearable device, and (ii) a cryptographic reference that includes a reference to a first cryptographic technique; means for determining the first cryptographic technique based on the reference to the first cryptographic technique; means for determining a cryptographic key; means for decrypting the encrypted data using the first cryptographic technique and cryptographic key to obtain decrypted data; and means for storing the decrypted data.

BRIEF DESCRIPTION OF THE DRAWINGS

FIG. 11A shows a message format including a cryptographic reference, in accordance with an example embodiment.

FIG. 11B shows a format for a cryptographic reference, in accordance with an example embodiment.

FIG. 11C illustrates a format for a cryptographic type indicator, in accordance with an example embodiment.

FIG. 11D illustrates a format for a cryptographic-algorithm type-specific reference, in accordance with an example embodiment.

FIG. 11E illustrates a format for a cryptographic-pattern type-specific reference, in accordance with an example embodiment.

FIG. 12A shows a format for a message with a cryptographic multi-reference, in accordance with an example embodiment.

FIG. 12B shows a format for a cryptographic multi-reference, in accordance with an example embodiment.

DETAILED DESCRIPTION

Figure 1:
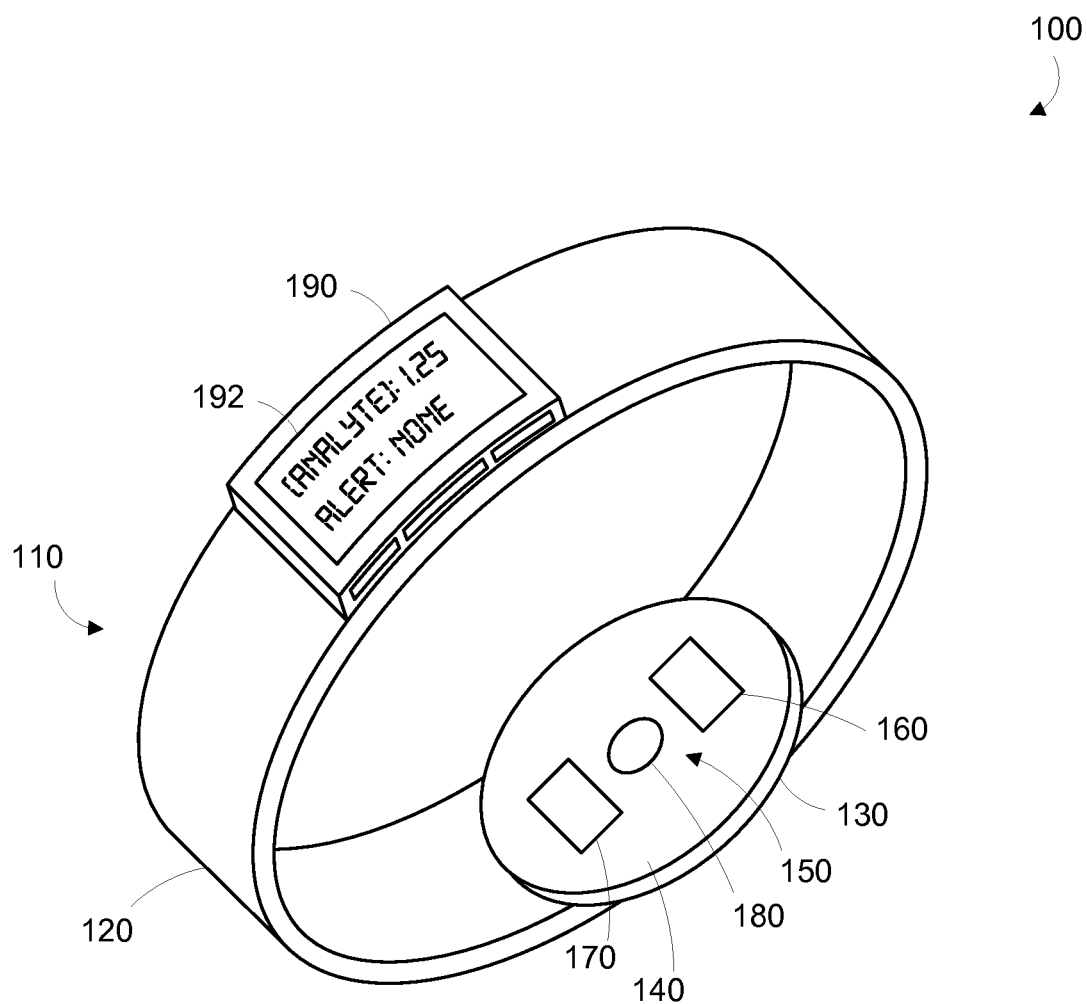
FIG. 1 is a perspective view of an example wearable device, in accordance with an example embodiment.

Transmitting Sensitive Information Securely Over Unsecured Networks without Authentication Some wearable computing devices can obtain, generate, and/or store sensitive data, such as physiological information about a wearer of a wearable computing device. In some cases, part or all of the sensitive data can be sensitive data. As data communicated by the wearable device can be sensitive, data communicated from the wearable device can be encrypted. Typical encryption techniques are based on authentication; e.g., a user logs into a device and encryption data, such as a private key, is based on the authentication data, such as a login ID or login ID/password combination. Another authentication technique involves use of a handshaking protocol, such as the Challenge Handshake Authentication Protocol (CHAP), to share information related to a password, rather than sending password data directly. However, wearable-device wearers may have difficulty remembering and/or configuring authentication data, such as passwords.

To address these concerns, techniques for encrypting data are provided without being based on authentication. Rather, a factory-installed cryptographic reference can be added to a wearable device. One example factory-installed cryptographic reference is a factory-installed key that can be used to encrypt or decrypt data. When the factory-installed key is used to encrypt data to be sent to another device, such as a server, the wearable device can provide a reference to the factory-installed key with the encrypted data. Then, the receiving server device can use the reference to derive the factory-installed key and decrypt the data. To send data to the wearable device, the server can use addressing and/or identification information about the wearable device; e.g., a MAC address, a serial number, to look up a stored reference to derive the factory-installed key for the wearable device and then encrypt the data. In some cases, the addressing and/or identification information about the wearable device can be used to look up the factory-installed key, thereby saving derivation of the key from the reference. To provide secure environments for processing messages, key references, and keys, the server can include a hardware security module (HSM). Example hardware security modules are manufactured under the nCipher brand name by Thales e-Security Inc. of Plantation, Fla. and SafeNet hardware security modules manufactured by SafeNet, Inc. of Belcamp, Md.

The factory-installed cryptographic reference can include other data as well. For example, the cryptographic reference can include information about which cryptographic algorithm(s) are used to encrypt data and/or can be used to decrypt data. These cryptographic algorithms can include, but are not limited to, one or more symmetric-key algorithms, one or more public-key algorithms, and one or more code-based algorithms.

A reference to an algorithm can include one or more modifiers to indicate a specific choice of algorithm; e.g., if the cryptographic algorithm being referred to a Data Encryption Standard (DES) algorithm, then a modifier to can specify which variant of DES and/or how many bits is begin used—Triple DES, Generalized DES, 56-bit DES, etc.

Another type of cryptographic data is key data, discussed above in the example of the factory-installed key. In some cases, seed values can be provided as key data. A seed value is an initial value used to initiate a cryptographic algorithm or computational component used by a cryptographic system; e.g., a pseudo-random number generator. In some cases, cryptographic algorithms can be based on data patterns. For example, a data pattern can select bits of interest (or to be discarded) from a data stream, such as can be used in steganography. Then, a cryptographic reference can include a type indicating a data pattern is part of, or being referred to, by the cryptographic reference.

A cryptographic multi-reference can be provided that allows for multiple references to cryptographic algorithms, data patterns, key data, and perhaps other data items. This allows specification of a wide variety of parameters and algorithms to be used to communicate data securely via encryption without requiring authentication. Further, if a group of computing devices agree upon selection of various reference values; e.g., use of a one or a few cryptographic techniques, data patterns, and usages for key/seed values, then a "cryptographic region" of devices can be generated. All devices in the cryptographic region can then be configured to support the agreed-upon selected parameters. For example, if a cryptographic region allowed selection of one of two cryptographic-algorithm references, then devices in the cryptographic region could be configured with implementations of each of the two cryptographic algorithms. This would allow the cryptographic region to change cryptographic algorithms if needed; e.g., if a cryptographic algorithm were compromised. If a selected cryptographic algorithm was later replaced or superseded, then the devices in the cryptographic region can be updated to support the replaced/superseded cryptographic algorithm, either automatically; e.g., via an automated software updating system, or manually; e.g., via user selection and downloading of an application.

Use of cryptographic references can allow for secure data transmission without authentication. The cryptographic references can provide for flexibility in selection of cryptographic algorithms and related data, including permitting devices to signal changes in cryptography used on a per-message basis. This flexibility can be used to ensure security even if a cryptographic algorithm is compromised—a device can switch to using a non-compromised algorithm and signal the change via a suitable cryptographic reference on a per-message basis. Further, cryptographic references can readily enable changes in hardware and/or software capabilities for cryptography, thus allowing devices to evolve security strategies over time.

Example Wearable Devices

A wearable device 100 can automatically measure a plurality of physiological parameters of a person wearing the device. The term "wearable device," as used in this disclosure, refers to any device that is capable of being worn at, on or in proximity to a body surface, such as a wrist, ankle, waist, chest, or other body part. In order to take in vivo measurements in a non-invasive manner from outside of the body, the wearable device may be positioned on a portion of the body where subsurface vasculature is easily observable, the qualification of which will depend on the type of detection system used. The device may be placed in close proximity to the skin or tissue, but need not be touching or in intimate contact therewith. A mount 110, such as a belt, wristband, ankle band, etc. can be provided to mount the device at, on or in proximity to the body surface. The mount 110 may prevent the wearable device from moving relative to the body to reduce measurement error and noise. In one example, shown in FIG. 1, the mount 110, may take the form of a strap or band 120 that can be worn around a part of the body. Further, the mount 110 may be an adhesive substrate for adhering the wearable device 100 to the body of a wearer.

A measurement platform 130 is disposed on the mount 110 such that it can be positioned on the body where subsurface vasculature is easily observable. An inner face 140 of the measurement platform is intended to be mounted facing to the body surface. The measurement platform 130 may house the data collection system 150, which may include at least one detector 160 for detecting at least one physiological parameter, which could include any parameters that may relate to the health of the person wearing the wearable device. For example, the detector 160 could be configured to measure blood pressure, pulse rate, respiration rate, skin temperature, etc. At least one of the detectors 160 is configured to non-invasively measure one or more analytes in blood circulating in subsurface vasculature proximate to the wearable device. In a non-exhaustive list, detector 160 may include any one of an optical (e.g., CMOS, CCD, photodiode), acoustic (e.g., piezoelectric, piezoceramic), electrochemical (voltage, impedance), thermal, mechanical (e.g., pressure, strain), magnetic, or electromagnetic (e.g., magnetic resonance) sensor. The components of the data collection system 150 may be miniaturized so that the wearable device may be worn on the body without significantly interfering with the wearer's usual activities.

In an example embodiment, the wearable device obtains at least some of the health-related information by detecting the binding of a clinically-relevant analyte to functionalized particles, for example, microparticles or nanoparticles introduced into a lumen of the subsurface vasculature. The term "binding" is understood in its broadest sense to also include a detectable interaction between the clinically relevant analyte and the functionalized particles. The particles can have a diameter that is less than about 20 micrometers. In some embodiments, the particles have a diameter on the order of about 10 nm to 1 μm. In further embodiments, small particles on the order of 10-100 nm in diameter may be assembled to form a larger "clusters" or "assemblies" on the order of 1-10 micrometers. Those of skill in the art will understand a "particle" in its broadest sense and that it may take the form of any fabricated material, a molecule, cryptophane, a virus, a phage, etc. Further, a particle may be of any shape, for example, spheres, rods, non-symmetrical shapes, etc.

In some examples, the particles may be magnetic and can be formed from a paramagnetic, super-paramagnetic or ferromagnetic material or any other material that responds to a magnetic field. Alternatively, the particles may also be made of non-magnetic materials such as polystyrene.

The particles, or a group of several particles in a complex, may be functionalized with a receptor that has a specific affinity to bind to or interact with a clinically relevant analyte. The receptor may be inherent to the particle itself. For example, the particle itself may be a virus or a phage with an inherent affinity for certain analytes. Additionally or alternatively, the particles can be functionalized by covalently attaching a receptor that specifically binds or otherwise recognizes a particular clinically-relevant analyte. The functionalized receptor can be an antibody, peptide, nucleic acid, phage, bacteria, virus, or any other molecule with a defined affinity for a target analyte. Other compounds or molecules, such as fluorophores or autofluorescent or luminescent markers, which may assist in interrogating the particles in vivo, may also be attached to the particles.

The functionalized particles can be introduced into the person's blood stream by injection, ingestion, inhalation, transdermally, or in some other manner. Where magnetic particles are used, the wearable device may include a magnet that can direct into the portion of subsurface vasculature a magnetic field that is sufficient to cause the functionalized magnetic particles to collect in a lumen of that portion of subsurface vasculature. However, measurements may be taken without localized "collection" of the functionalized particles. The wearable device may be configured to activate the magnetic periodically, such as at certain times of every day (e.g., every hour).

In some examples, the data collection system 150 further includes a signal source 170 for transmitting an interrogating signal that can penetrate the wearer's skin into the portion of subsurface vasculature, for example, into a lumen of the subsurface vasculature. The interrogating signal can be any kind of signal that is benign to the wearer, such as electromagnetic, magnetic, optic, acoustic, thermal, mechanical, and results in a response signal that can be used to measure a physiological parameter or, more particularly, that can detect the binding of the clinically-relevant analyte to the functionalized particles. In one example, the interrogating signal is an electromagnetic pulse (e.g., a radio frequency (RF) pulse) and the response signal is a magnetic resonance signal, such as nuclear magnetic resonance (NMR). In another example, the interrogating signal is a time-varying magnetic field, and the response signal is an externally-detectable physical motion due to the time-varying magnetic field. The time-varying magnetic field modulates the particles by physical motion in a manner different from the background, making them easier to detect. In a further example, the interrogating signal is an electromagnetic radiation signal. In particular, the interrogating signal may be electromagnetic radiation having a wavelength between about 400 nanometers and about 1600 nanometers. The interrogating signal may, more particularly, comprise electromagnetic radiation having a wavelength between about 500 nanometers and about 1000 nanometers. In some examples, the functionalized particles include a fluorophore. The interrogating signal may therefore be an electromagnetic radiation signal with a wavelength that can excite the fluorophore and penetrate the skin or other tissue and subsurface vasculature (e.g., a wavelength in the range of about 500 to about 1000 nanometers), and the response signal is fluorescence radiation from the fluorophore that can penetrate the subsurface vasculature and tissue to reach the detector.

In some cases, an interrogating signal is not necessary to measure one or more of the physiological parameters and, therefore, the wearable device 100 may not include a signal source 170. For example, the functionalized particles include an autofluorescent or luminescent marker, such as a fluorophore, that will automatically emit a response signal indicative of the binding of the clinically-relevant analyte to the functionalized particles, without the need for an interrogating signal or other external stimulus. In some examples, the functionalized particles may include a chemoluminescent marker configured to produce a response signal in the form of fluorescence radiation produced in response to a chemical reaction initiated, at least in part, to the binding of the target analyte to the particle.

A collection magnet 180 may also be included in the data collection system 150. In such embodiments, the functionalized particles may also be made of or be functionalized with magnetic materials, such as ferromagnetic, paramagnetic, super-paramagnetic, or any other material that responds to a magnetic field. The collection magnet 180 is configured to direct a magnetic field into the portion of subsurface vasculature that is sufficient to cause functionalized magnetic particles to collect in a lumen of that portion of subsurface vasculature. The magnet may be an electromagnet that may be turned on during measurement periods and turned off when a measurement period is complete so as to allow the magnetic particles to disperse through the vasculature.

The wearable device 100 may also include a user interface 190 via which the wearer of the device may receive one or more recommendations or alerts generated either from a remote server or other remote computing device, or from a processor within the device. The alerts could be any indication that can be noticed by the person wearing the wearable device. For example, the alert could include a visual component (e.g., textual or graphical information on a display), an auditory component (e.g., an alarm sound), and/or tactile component (e.g., a vibration). Further, the user interface 190 may include a display 192 where a visual indication of the alert or recommendation may be displayed. The display 192 may further be configured to provide an indication of the measured physiological parameters, for instance, the concentrations of certain blood analytes being measured.

Figure 2A:
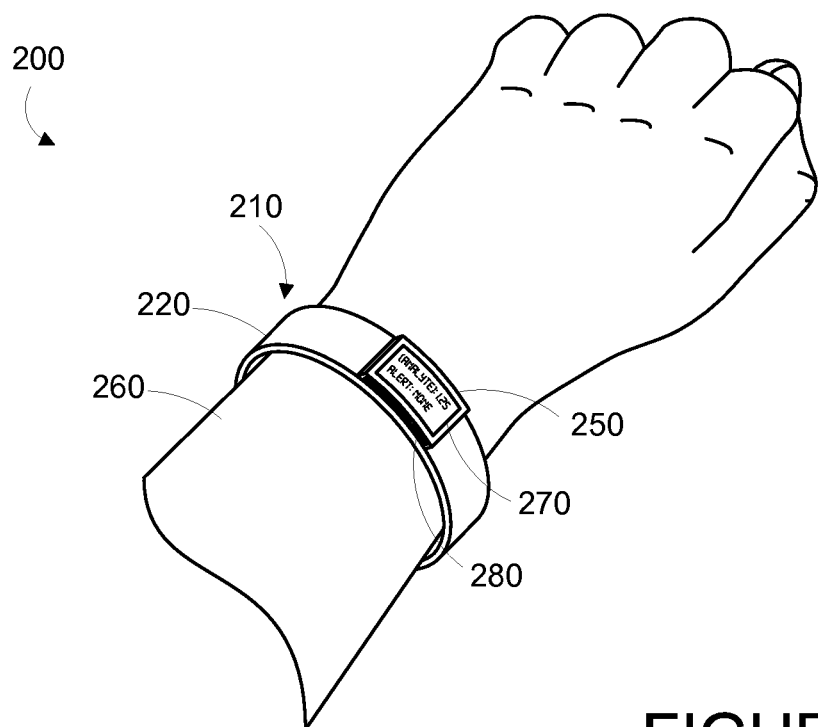
FIG. 2A is a perspective top view of an example wrist-mounted device, when mounted on a wearer's wrist, in accordance with an example embodiment.
Figure 2B:
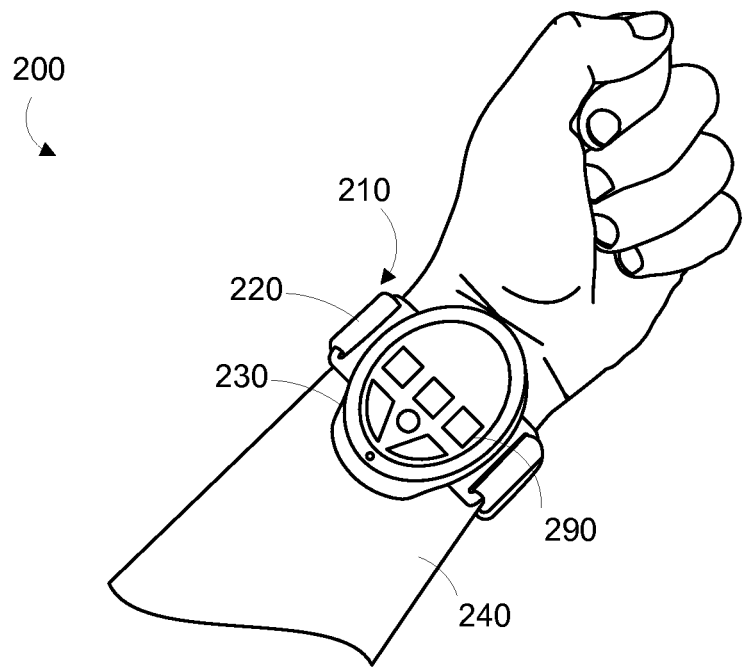
FIG. 2B is a perspective bottom view of an example wrist-mounted device shown in FIG. 2A, when mounted on a wearer's wrist, in accordance with an example embodiment.

In one example, the wearable device is provided as a wrist-mounted device, as shown in FIGS. 2A, 2B, 3A-3C, 4A, 4B, 5, and 6. The wrist-mounted device may be mounted to the wrist of a living subject with a wristband or cuff, similar to a watch or bracelet. As shown in FIGS. 2A and 2B, the wrist mounted device 200 may include a mount 210 in the form of a wristband 220, a measurement platform 230 positioned on the anterior side 240 of the wearer's wrist, and a user interface 250 positioned on the posterior side 260 of the wearer's wrist. The wearer of the device may receive, via the user interface 250, one or more recommendations or alerts generated either from a remote server or other remote computing device, or alerts from the measurement platform. Such a configuration may be perceived as natural for the wearer of the device in that it is common for the posterior side 260 of the wrist to be observed, such as the act of checking a wrist-watch. Accordingly, the wearer may easily view a display 270 on the user interface. Further, the measurement platform 230 may be located on the anterior side 240 of the wearer's wrist where the subsurface vasculature may be readily observable. However, other configurations are contemplated.

The display 270 may be configured to display a visual indication of the alert or recommendation and/or an indication of the measured physiological parameters, for instance, the concentrations of certain blood analytes being measured. Further, the user interface 250 may include one or more buttons 280 for accepting inputs from the wearer. For example, the buttons 280 may be configured to change the text or other information visible on the display 270. As shown in FIG. 2B, measurement platform 230 may also include one or more buttons 290 for accepting inputs from the wearer. The buttons 290 may be configured to accept inputs for controlling aspects of the data collection system, such as initiating a measurement period, or inputs indicating the wearer's current health state (i.e., normal, migraine, shortness of breath, heart attack, fever, "flu-like" symptoms, food poisoning, etc.).

Figure 3A:
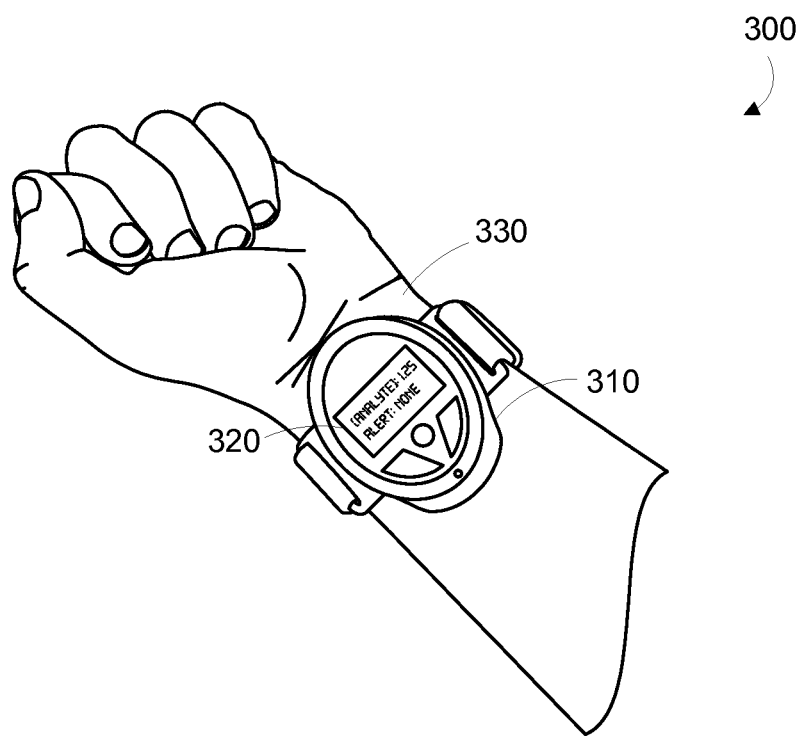
FIG. 3A is a perspective bottom view of an example wrist-mounted device, when mounted on a wearer's wrist, in accordance with an example embodiment.
Figure 3B:
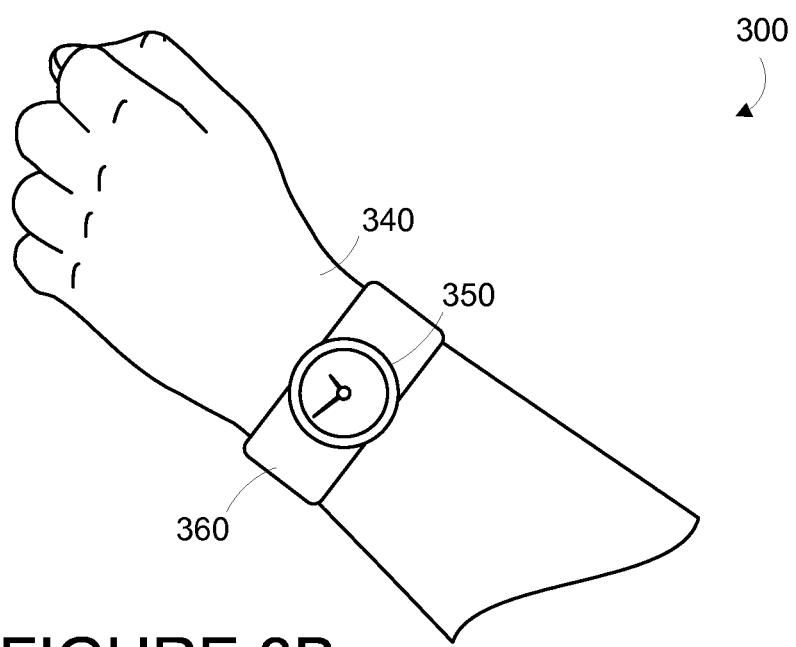
FIG. 3B is a perspective top view of an example wrist-mounted device shown in FIG. 3A, when mounted on a wearer's wrist, in accordance with an example embodiment.
Figure 3C:
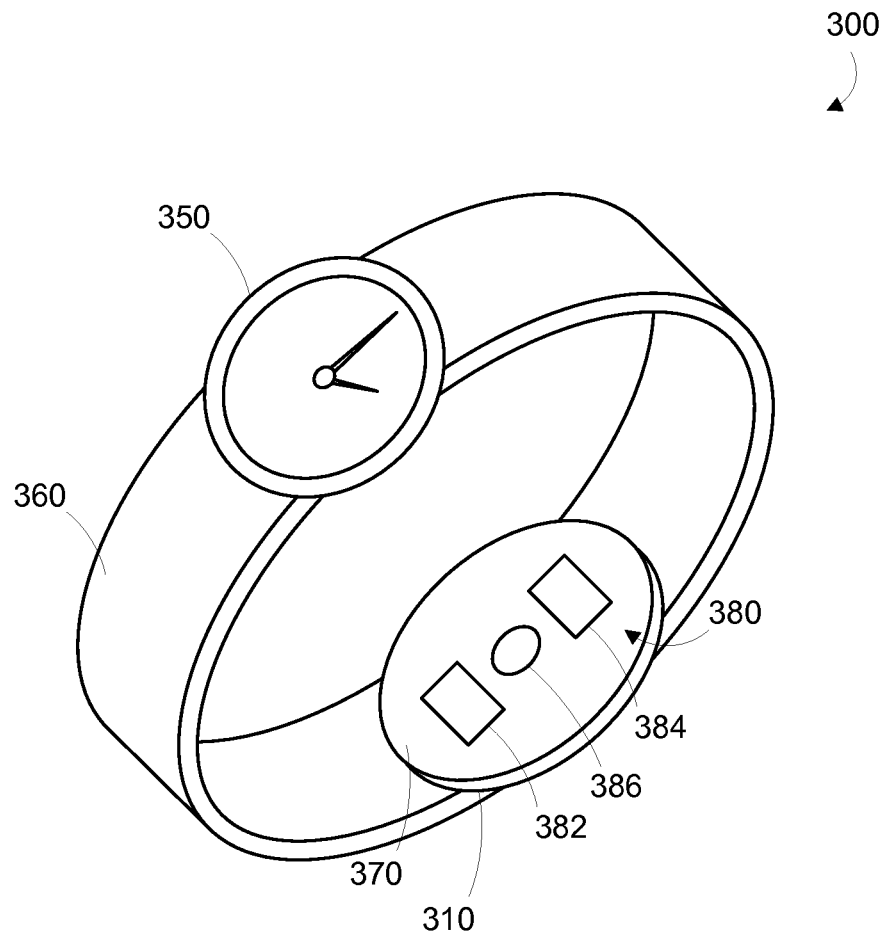
FIG. 3C is a perspective view of an example wrist-mounted device shown in FIGS. 3A and 3B, in accordance with an example embodiment.

In another example wrist-mounted device 300, shown in FIGS. 3A-3C, the measurement platform 310 and user interface 320 are both provided on the same side of the wearer's wrist, in particular, the anterior side 330 of the wrist. On the posterior side 340, a watch face 350 may be disposed on the strap 360. While an analog watch is depicted in FIG. 3B, one of skill in the art will recognize that any type of clock may be provided, such as a digital clock.

As can be seen in FIG. 3C, the inner face 370 of the measurement platform 310 is intended to be worn proximate to the wearer's body. A data collection system 380 housed on the measurement platform 310 may include a detector 382, a signal source 384 and a collection magnet 386. As described above, the signal source 384 and the collection magnet 386 may not be provided in all embodiments of the wearable device.

Figure 4A:
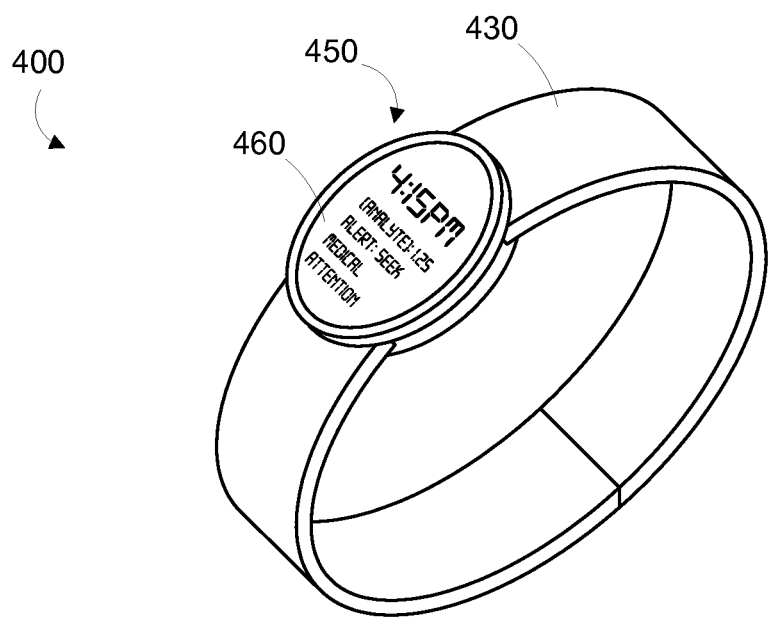
FIG. 4A is a perspective view of an example wrist-mounted device, in accordance with an example embodiment.
Figure 4B:
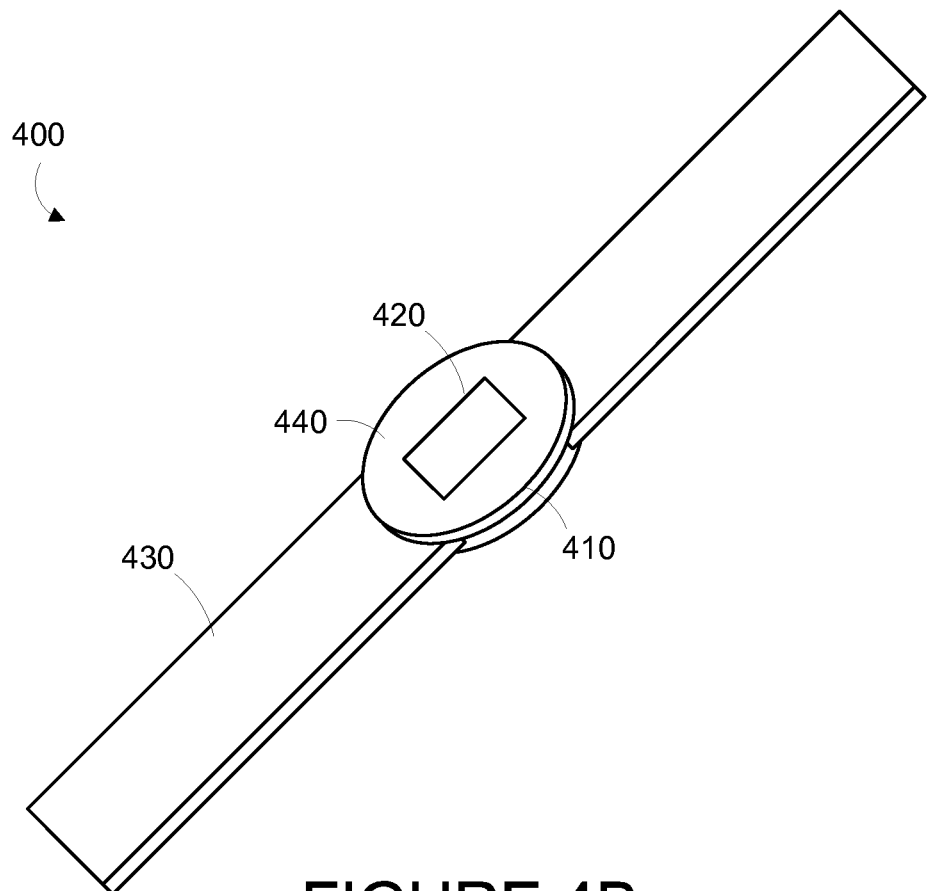
FIG. 4B is a perspective bottom view of an example wrist-mounted device shown in FIG. 4A, in accordance with an example embodiment.

In a further example shown in FIGS. 4A and 4B, a wrist mounted device 400 includes a measurement platform 410, which includes a data collection system 420, disposed on a strap 430. Inner face 440 of measurement platform may be positioned proximate to a body surface so that data collection system 420 may interrogate the subsurface vasculature of the wearer's wrist. A user interface 450 with a display 460 may be positioned facing outward from the measurement platform 410. As described above in connection with other embodiments, user interface 450 may be configured to display data collected from the data collection system 420, including the concentration of one or more measured analytes, and one or more alerts generated by a remote server or other remote computing device, or a processor located on the measurement platform. The user interface 420 may also be configured to display the time of day, date, or other information that may be relevant to the wearer.

Figure 5:
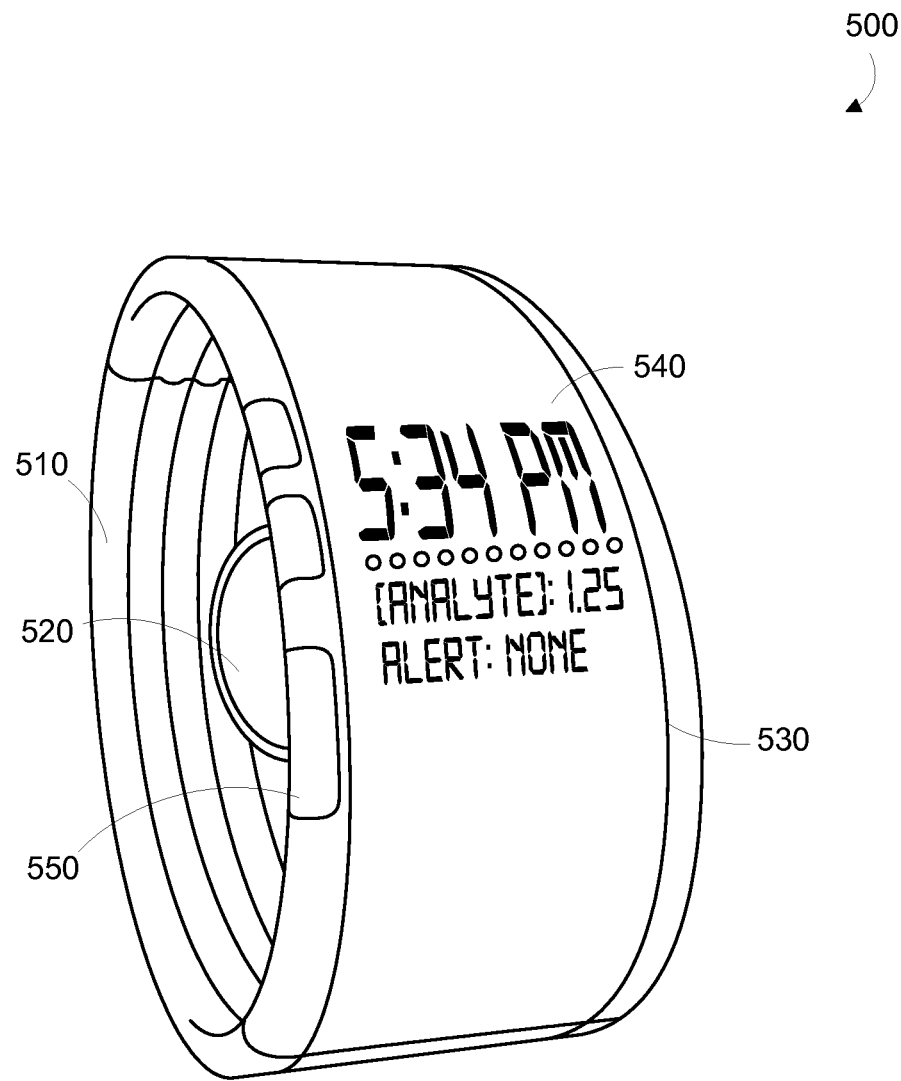
FIG. 5 is a perspective view of an example wrist-mounted device, in accordance with an example embodiment.
Figure 6:
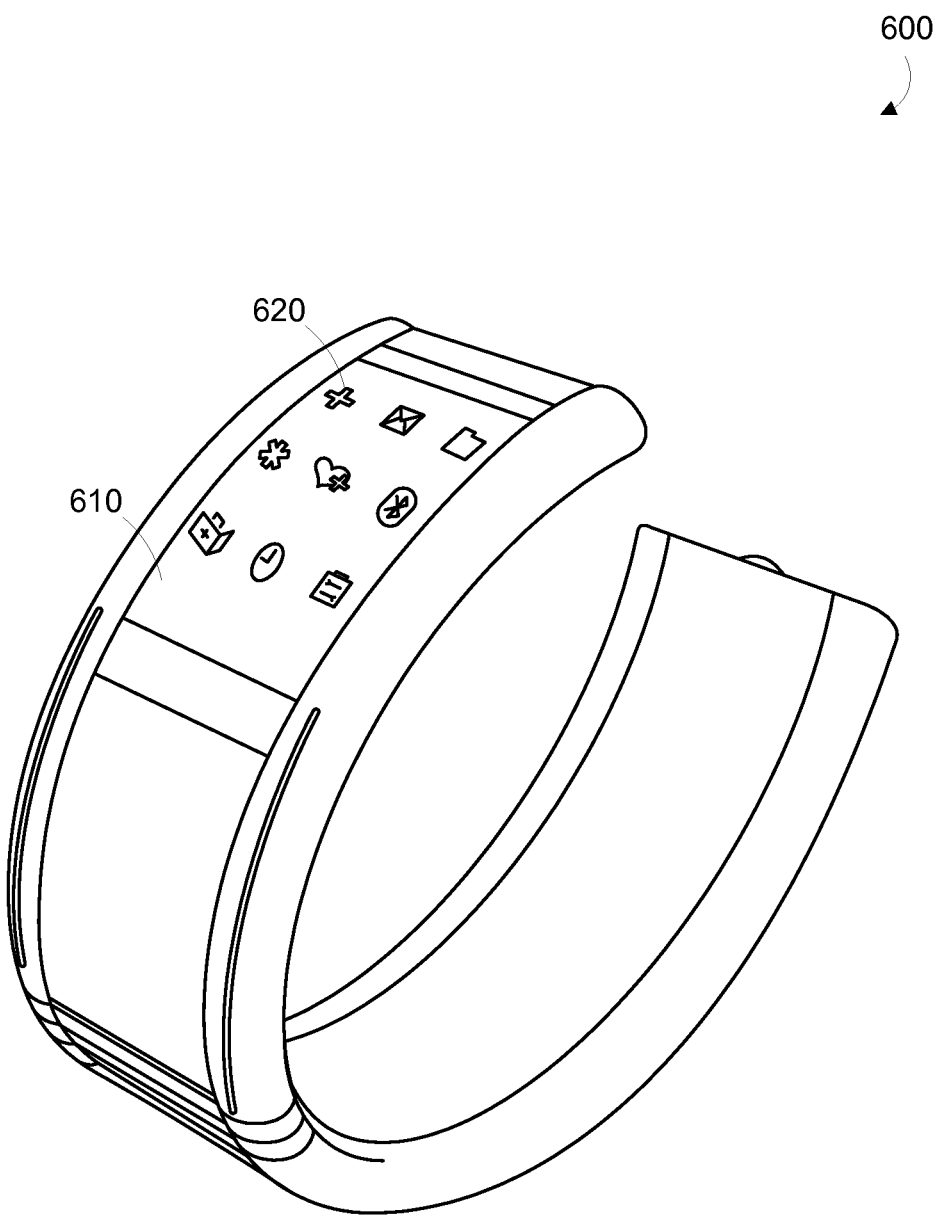
FIG. 6 is a perspective view of an example wrist-mounted device, in accordance with an example embodiment.

As shown in FIG. 5, in a further embodiment, wrist-mounted device 500 may be provided on a cuff 510. Similar to the previously discussed embodiments, device 500 includes a measurement platform 520 and a user interface 530, which may include a display 540 and one or more buttons 550. The display 540 may further be a touch-screen display configured to accept one or more input by the wearer. For example, as shown in FIG. 6, display 610 may be a touch-screen configured to display one or more virtual buttons 620 for accepting one or more inputs for controlling certain functions or aspects of the wearable device 600, or inputs of information by the user, such as current health state.

Figure 7:
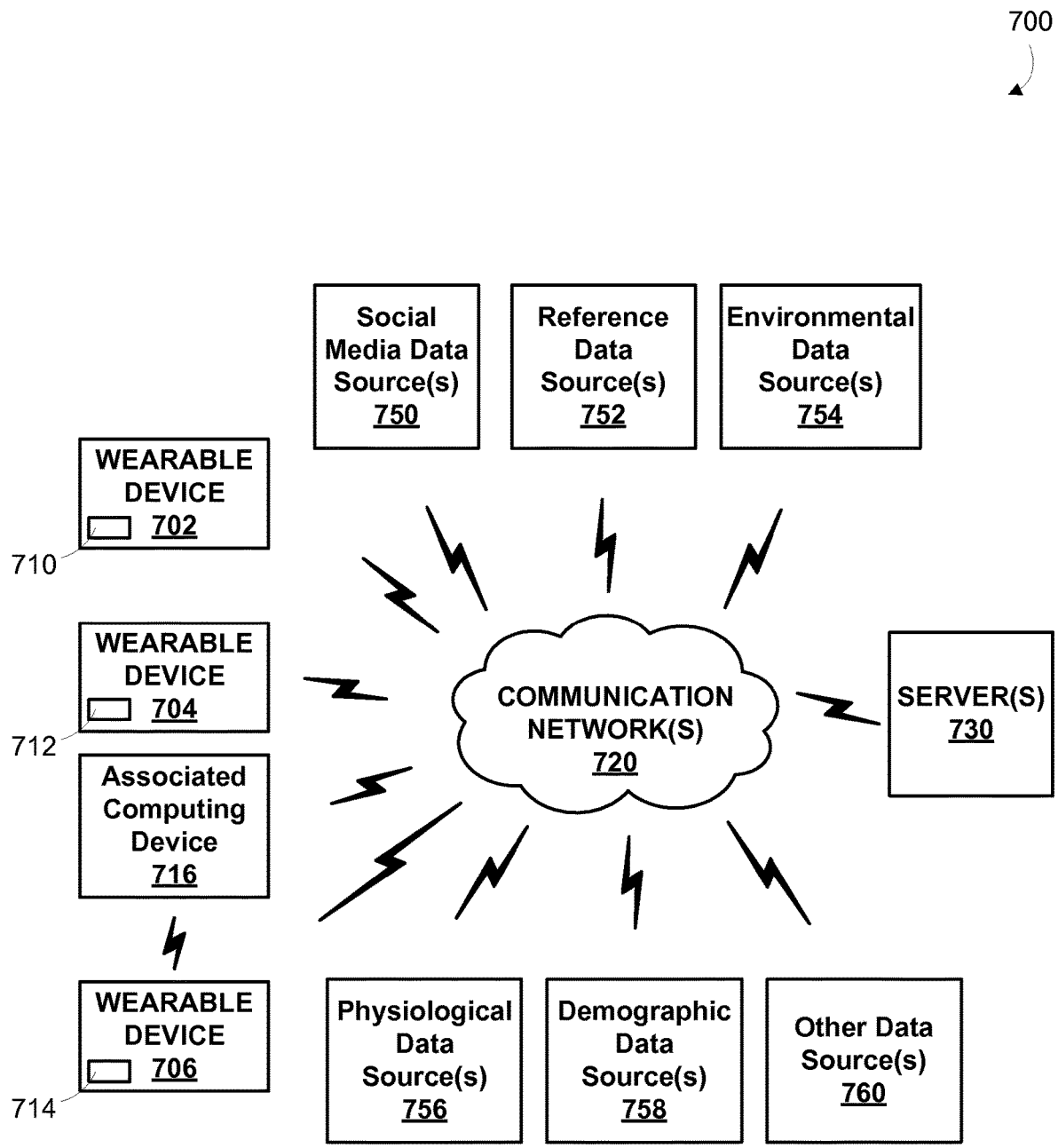
FIG. 7 is a block diagram of an example system that includes a plurality of wearable devices and a plurality of data sources in communication with servers, in accordance with an example embodiment.

FIG. 7 is a block diagram of system 700 that includes a plurality of wearable devices 702, 704, 706 and a plurality of data sources 750, 752, 754, 756, 758, 760 in communication with server(s) 730. Wearable devices 702, 704, 706 can be configured to transmit data via respective communication interfaces 710, 712, 714 over one or more communication networks 720 to a remote server 730. In some embodiments, one or more of communication interfaces 710, 712, 714 can include a wireless transceiver for sending and receiving communications to and from server(s) 730. In further embodiments, one or more of communication interfaces 710, 712, 714 can include wired and wireless communication interfaces for the transfer of data. For example, one or more of communication interfaces 710, 712, 714 can include a universal serial bus (USB) interface or a secure digital (SD) card interface.

Communication networks 720 can be any one of: a plain old telephone service (POTS) network, a cellular network, a wired network, a fiber network, a wireless network and a data network. Server(s) 730 may include any type of remote computing device or remote cloud computing network. Further, communication network 720 can include one or more intermediaries; for example, wearable device 704 can transmit data to associated computing device 716 that in turn can transmit the data from wearable device 704 to server(s) 730. Examples of associated computing device 716 include, but are not limited to, a mobile phone, smart phone, or other personal computing device. In some scenarios as indicated in FIG. 7, wearable device 704 can transmit to communication network 720 directly as well.

In addition to receiving communications from wearable devices 702, 704, 706 such as collected physiological parameter data and data regarding health state as input by respective wearers of wearable devices 702, 704, 706, server(s) 730 can also be configured to gather and/or receive either from wearable devices 702, 704, 706 or from one or more other data sources, information regarding a wearer, the wearer's overall medical history, environmental factors and geographical data. Examples of these other data sources include social media data source(s) 750 for social media data associated with the wearer, reference data source(s) 752 for reference data associated with physiological and/or other types of data associated with the wearer and/or wearable device, environmental data source(s) 754 for data associated with an environment for the wearer (e.g., health-related environmental data from the Centers for Disease Control (CDC), National Health Service, and similar sources; weather, pollution and allergen data from the National Weather Service and similar sources; traffic, news, and/or other information about the environment for the wearer), physiological data source(s) 756 for data about health and/or medically related information about one or more biological entities; e.g., persons, demographic data source(s) 758 for demographic and other population-associated data associated with a wearer and/or wearable device, and other data source(s) 760.

Data about a wearer (or other entity) can be stored on server(s) 730. For example, a user account may be established on server(s) 730 for a wearer, where the account contains information about the wearer's medical history, and where some or all of the information about the wearer's medical history is stored on server(s) 730. Moreover, in some examples, the server 730 may be configured to regularly receive information from some or all of data sources 750-760. Then, some or all of the received information from data sources 750-760 can be stored with the wearer's account; e.g., on server(s) 730. Further, server(s) 730 can be configured to communicate and store data regarding a wearer's health state from a hospital or physician. Such information may be used in the server's decision-making process, such as recognizing correlations and in generating clinical protocols.

Server(s) 730 may also be configured to make determinations regarding the efficacy of a drug or other treatment based on information regarding the drugs or other treatments received by a wearer of the device and, at least in part, the physiological parameter data and the indicated health state of the user derived from data stored on server(s) 730. From this information, server(s) 730 can be configured to derive an indication of the effectiveness of the drug or treatment. For example, if a drug is intended to treat nausea and the wearer of the device does not indicate that he or she is experiencing nausea after beginning a course of treatment with the drug, the server may be configured to derive an indication that the drug is effective for that wearer. In another example, a wearable device may be configured to measure blood glucose. If a wearer is prescribed a drug intended to treat diabetes, but the server receives data from the wearable device indicating that the wearer's blood glucose has been increasing over a certain number of measurement periods, the server may be configured to derive an indication that the drug is not effective for its intended purpose for this wearer.

Further, some embodiments of system 700 may include privacy controls which may be automatically implemented or controlled by the wearer of the device. As one example, where a wearer's collected physiological parameter data and health state data are uploaded to a cloud computing network for trend analysis by a clinician, the data may be treated in one or more ways before it is stored or used, so that personally identifiable information is removed. That is, a user's identity may be treated so that no personally identifiable information can be determined for the user, or a user's geographic location may be generalized where location information is obtained (such as to a city, ZIP code, or state level), so that a particular location of a user cannot be determined.

Additionally or alternatively, wearers of a wearable device may be provided with an opportunity to control whether or how the device collects information about the wearer (e.g., information about a user's medical history, social actions or activities, profession, a user's preferences, or a user's current location), or to control how such information may be used. Thus, the wearer may have control over how information is collected about him or her and used by a clinician or physician or other user of the data. For example, a wearer may elect that data, such as health state and physiological parameters, collected from his or her device may only be used for generating an individual baseline and recommendations in response to collection and comparison of his or her own data and may not be used in generating a population baseline or for use in population correlation studies.

Figure 8A:
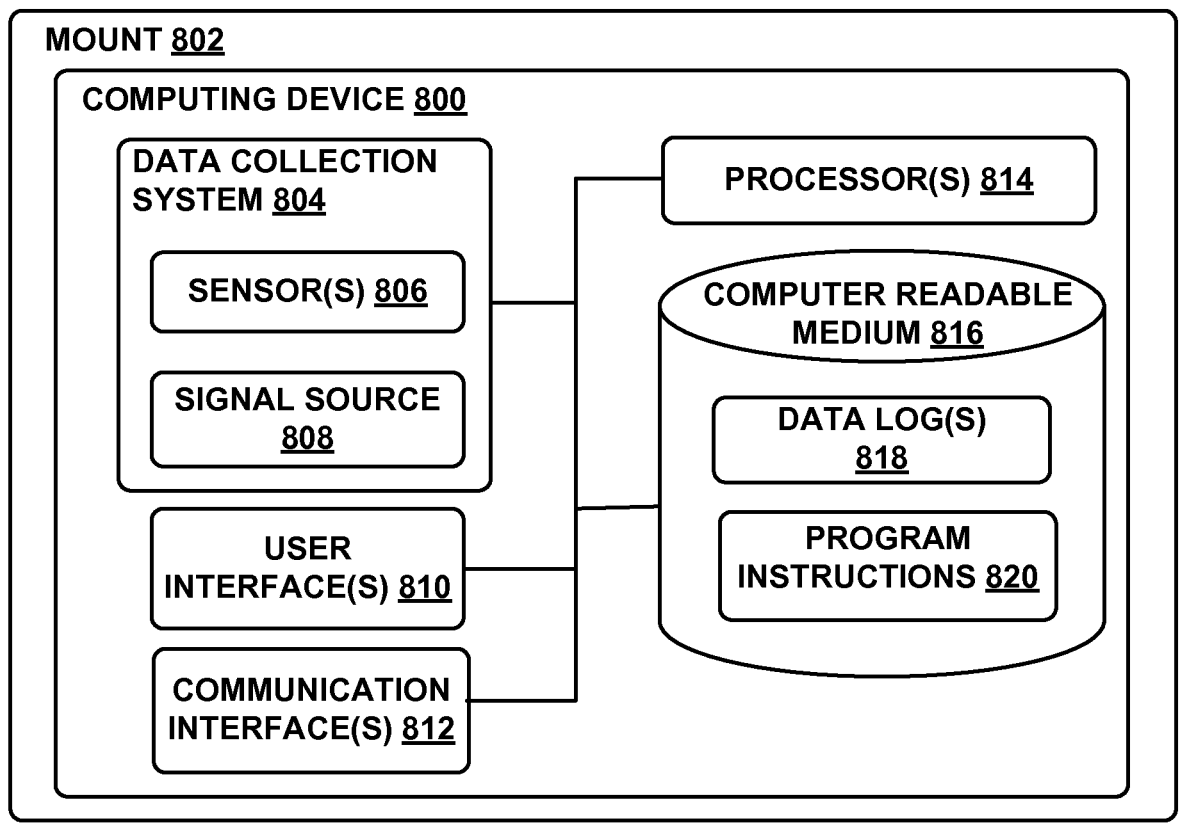
FIG. 8A is a functional block diagram of an example computing device, in accordance with an example embodiment.

FIG. 8A is a functional block diagram of example computing device 800, in accordance with an example embodiment. Computing device 800 may be configured to carry out some or all the herein-described functionality of wrist-mounted devices 100, 200, 300, 400, 500, 600, wearable devices 702, 704, 706, 1312, 1314, 1322, 1324, 1326, 1332, 1334, associated computing device 716, server(s) 730, 1020, method 900, and/or data sources 750, 752, 754, 756, 758, 760 shown in the Figures. However, computing device 800 may also take other forms, such as, but not limited to, an ankle-mountable device, a waist-mountable device, a chest-mountable device, a head-mountable device, a laptop computing device, a tablet computing device, a smart phone, or an immobile computing device.

In particular, FIG. 8A shows an example of a computing device 800 having a data collection system 804, a user interface 810, communication interface(s) 812, processor(s) 814, and computer-readable medium 816. The components of the computing device 800 can be disposed on mount 802 for mounting the device to an external body surface or other surface. In some embodiments, computing device 800 can be deployed without mount 802.

Processor(s) 814 can be one or more general-purpose processors and/or special purpose processors (e.g., digital signal processors, application specific integrated circuits, graphics processing units, etc.). Processor(s) 814 can be configured to execute computer-readable program instructions 820 stored in the computer readable medium 816, where program instructions 820 are executable by processor(s) 814 to provide and/or facilitate some or all the functionality described herein, including but not limited to, the functionality of a wrist-mounted device, wearable device, wearable computing device, associated computing device, data source, security module, and/or server(s) described herein. Computer readable medium 816 may further contain other data or information usable provide the functionality described herein, including but not limited to, the functionality of a wearable device, associated computing device, and/or server described herein. For example, as shown in FIG. 8A, computer readable medium 816 can store physiological and/or other biological data obtained by computing device 800, as well as other data. In some embodiments, some or all of the data stored computer readable medium 816 can be stored in data log(s) 818; for example, a data log of data log(s) 818 can store physiological and/or other biological data.

Computer readable medium 816 may include or take the form of one or more non-transitory, computer-readable storage media that can be read or accessed by at least one processor 814. The one or more computer-readable storage media can include volatile and/or non-volatile storage components, such as optical, magnetic, organic, electronic, flash, or other memory or disc storage, which can be integrated in whole or in part with at least one of processor(s) 814. In some embodiments, the computer readable medium 816 can be implemented using a single physical device (e.g., one optical, magnetic, organic, electronic, flash, or other memory or disc storage unit), while in other embodiments, the computer readable medium 816 can be implemented using two or more physical devices.

FIG. 8A shows that data collection system 804 includes sensor(s) 806 and, in some embodiments, a signal source 808. Signal source 808 may generate an interrogation signal, timing signal, and/or other signal that will produce a responsive signal that can be detected by one or more of sensor(s) 806.

Sensor(s) 806 may include any sensor and/or detector capable of detecting at least one physiological parameter, which could include any parameters that may relate to the health of the person wearing the wearable device. For example, sensor(s) 806 could include one or more detectors and/or sensors configured to measure physiological data, such as blood pressure, pulse rate, skin temperature, etc. In some examples, one or more of sensor(s) 806 is configured to non-invasively measure one or more analytes in blood circulating in subsurface vasculature proximate to the wearable device. In some embodiments, sensor(s) 806 may include one or more of an optical (e.g., CMOS, CCD, photodiode), acoustic (e.g., piezoelectric, piezoceramic), electrochemical (voltage, impedance), thermal, mechanical (e.g., pressure, strain), magnetic, or electromagnetic (e.g., magnetic resonance) sensor.

In some embodiments, sensor(s) 806 may include one or more sensors and/or detectors configured to measure conditions in an environment about computing device 800 and provide data about that environment. The data can include, but is not limited to: data about computing device 800, location data about computing device 800, velocity (speed, direction) data about computing device 800, acceleration data about computing device 800, and other data about the environment for computing device 800. Examples of sensor(s) 806 configured to measure conditions in an environment include, but are not limited to, power sensor(s), battery sensor(s), movement sensor(s), GPS sensor(s), location sensors(s), gyroscope(s), accelerometer(s), magnetometer(s), camera(s), light sensor(s), infrared sensor(s), and microphone(s).

User interface 810 may be operable to send data to and/or receive data from external user input/output devices. For example, user interface 810 can be configured to send and/or receive data to and/or from user input devices such as a keyboard, a keypad, a touch screen, a computer mouse, a track ball, a joystick, a camera, a voice recognition module, and/or other similar devices. User interface 810 can also be configured to provide output to user display devices, such as one or more cathode ray tubes (CRT), liquid crystal displays (LCDs), light emitting diodes (LEDs), displays using digital light processing (DLP) technology, printers, light bulbs, and/or other similar devices, either now known or later developed. User interface 810 can also be configured to generate audible output(s), such as a speaker, speaker jack, audio output port, audio output device, earphones, and/or other similar devices. In some embodiments, user interface 810 can be configured to generate haptic output(s), such as vibrations and/or other outputs detectable by touch and/or physical contact with computing device 800.

Communication interface(s) 812 of computing device 800 can be utilized for sending and/or receiving information. Communications interface(s) 812 can include a wireless interface and/or a wired interface, which can be disposed on or in computing device 800. The wireless interface can include one or more antennas, wireless transmitters, wireless receivers, and/or wireless transceivers, such as a Bluetooth transceiver, a Zigbee transceiver, a Wi-Fi transceiver, a WiMAX transceiver, and/or other similar type of wireless transceiver configurable to communicate via a wireless network. The wired interface of communications interface(s) 812 can include one or more wireline transmitters, receivers, and/or transceivers, such as a Universal Serial Bus (USB) transceiver, an Ethernet transceiver, and/or similar transceiver configurable to communicate via a twisted pair wire, a coaxial cable, a fiber-optic link, or a similar physical connection to a wired network. The communication interface(s) 812 can optionally include one or more oscillators, mixers, frequency injectors, etc. to modulate and/or demodulate information on a carrier frequency to be transmitted and/or received by the wireless interface. In some examples, computing device 800 is configured to indicate an output from the processor by modulating an impedance of the antenna in a manner that is perceivable by a remote server or other remote computing device.

Figure 8B:
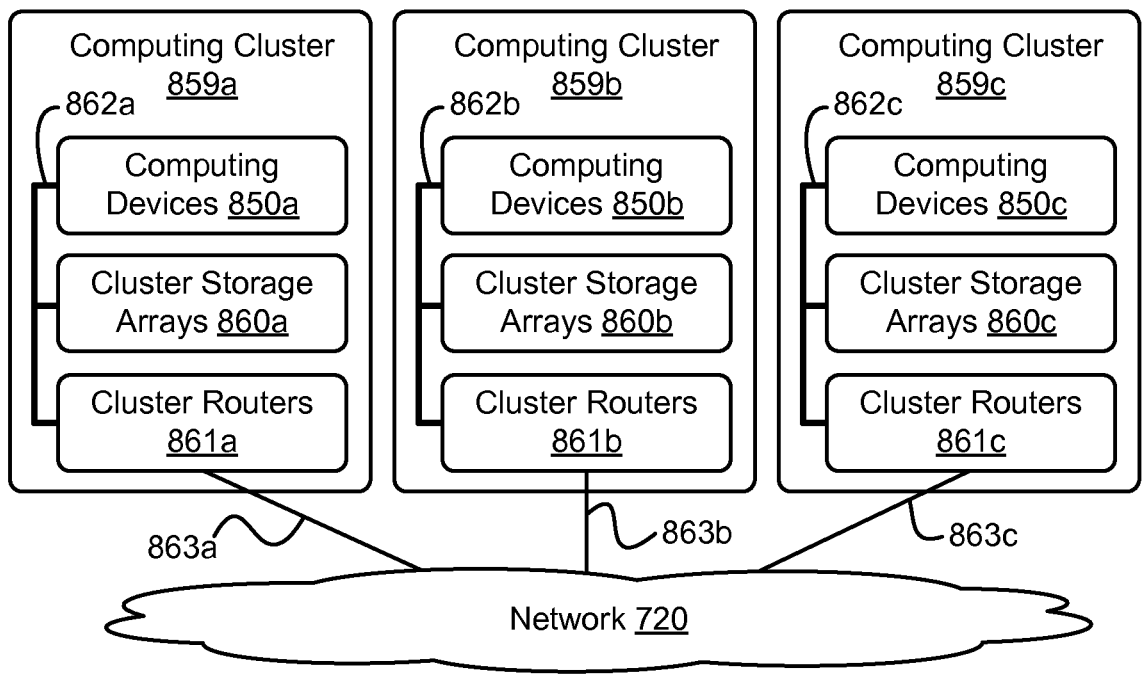
FIG. 8B depicts a cloud-based server system, in accordance with an example embodiment.

FIG. 8B depicts a cloud-based server system, in accordance with an example embodiment. FIG. 8B depicts a network 720 of computing clusters 859a, 859b, 859c arranged as a cloud-based server system in accordance with an example embodiment. Server(s) 730 and/or 1020 can be cloud-based devices that store program logic and/or data of cloud-based applications and/or services. In some embodiments, server(s) 730 and/or 1020 can be a single computing device residing in a single computing center. In other embodiments, server(s) 730 and/or 1020 can include multiple computing devices in a single computing center, or even multiple computing devices located in multiple computing centers located in diverse geographic locations. For example, FIG. 7 depicts server(s) 730 and/or 1020 residing in different physical locations.

In some embodiments, data and services at server(s) 730 and/or 1020 can be encoded as computer readable information stored in non-transitory, tangible computer readable media (or computer readable storage media) and accessible by wearable devices 702, 704, 706, 1312, 1314, 1322, 1324, 1326, 1332, 1334, associated computing device 716, communications networks 720, data sources 750-760, and/or other computing devices. In some embodiments, data at server(s) 730 can be stored on a single disk drive or other tangible storage media, or can be implemented on multiple disk drives or other tangible storage media located at one or more diverse geographic locations.

In FIG. 8B, the functions of server(s) 730 and/or 1020 can be distributed among three computing clusters 859a, 859b, and 859c. Computing cluster 859a can include one or more computing devices 850a, cluster storage arrays 860a, and cluster routers 861a connected by a local cluster network 862a. Similarly, computing cluster 859b can include one or more computing devices 850b, cluster storage arrays 860b, and cluster routers 861b connected by a local cluster network 862b. Likewise, computing cluster 859c can include one or more computing devices 850c, cluster storage arrays 860c, and cluster routers 861c connected by a local cluster network 862c.

In some embodiments, each of the computing clusters 859a, 859b, and 859c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 859a, for example, computing devices 850a can be configured to perform various computing tasks of electronic communications server 862. In one embodiment, the various functionalities of electronic communications server 862 can be distributed among one or more of computing devices 850a, 850b, and 850c. Computing devices 850b and 850c in computing clusters 859b and 859c can be configured similarly to computing devices 850a in computing cluster 859a. On the other hand, in some embodiments, computing devices 850a, 850b, and 850c can be configured to perform different functions.

In some embodiments, computing tasks and stored data associated with server(s) 730 and/or 1020 can be distributed across computing devices 850a, 850b, and 850c based at least in part on the processing requirements of server(s) 730 and/or 1020, the processing capabilities of computing devices 850a, 850b, and 850c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 860a, 860b, and 860c of the computing clusters 859a, 859b, and 859c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of server(s) 730 and/or 1020 can be distributed across computing devices 850a, 850b, and 850c of computing clusters 859a, 859b, and 859c, various active portions and/or backup portions of these components can be distributed across cluster storage arrays 860a, 860b, and 860c. For example, some cluster storage arrays can be configured to store the data related to some of server(s) 730 and/or 1020, while other cluster storage arrays can store data related to other of server(s) 730 and/or 1020. Additionally, some cluster storage arrays can be configured to store backup versions of data stored in other cluster storage arrays.

The cluster routers 861a, 861b, and 861c in computing clusters 859a, 859b, and 859c can include networking equipment configured to provide internal and external communications for the computing clusters. For example, the cluster routers 861a in computing cluster 859a can include one or more internet switching and routing devices configured to provide (i) local area network communications between the computing devices 850a and the cluster storage arrays 860a via the local cluster network 862a, and (ii) wide area network communications between the computing cluster 859a and the computing clusters 859b and 859c via the wide area network connection 863a to network 720. Cluster routers 861b and 861c can include network equipment similar to the cluster routers 861a, and cluster routers 861b and 861c can perform similar networking functions for computing clusters 859b and 859c that cluster routers 861a perform for computing cluster 859a.

In some embodiments, the configuration of the cluster routers 861a, 861b, and 861c can be based at least in part on the data communication requirements of the computing devices and cluster storage arrays, the data communications capabilities of the network equipment in the cluster routers 861a, 861b, and 861c, the latency and throughput of local networks 862a, 862b, 862c, the latency, throughput, and cost of wide area network links 863a, 863b, and 863c, and/or other factors that can contribute to the cost, speed, fault-tolerance, resiliency, efficiency and/or other design goals of the moderation system architecture.

Example Methods of Operation

Figure 9:
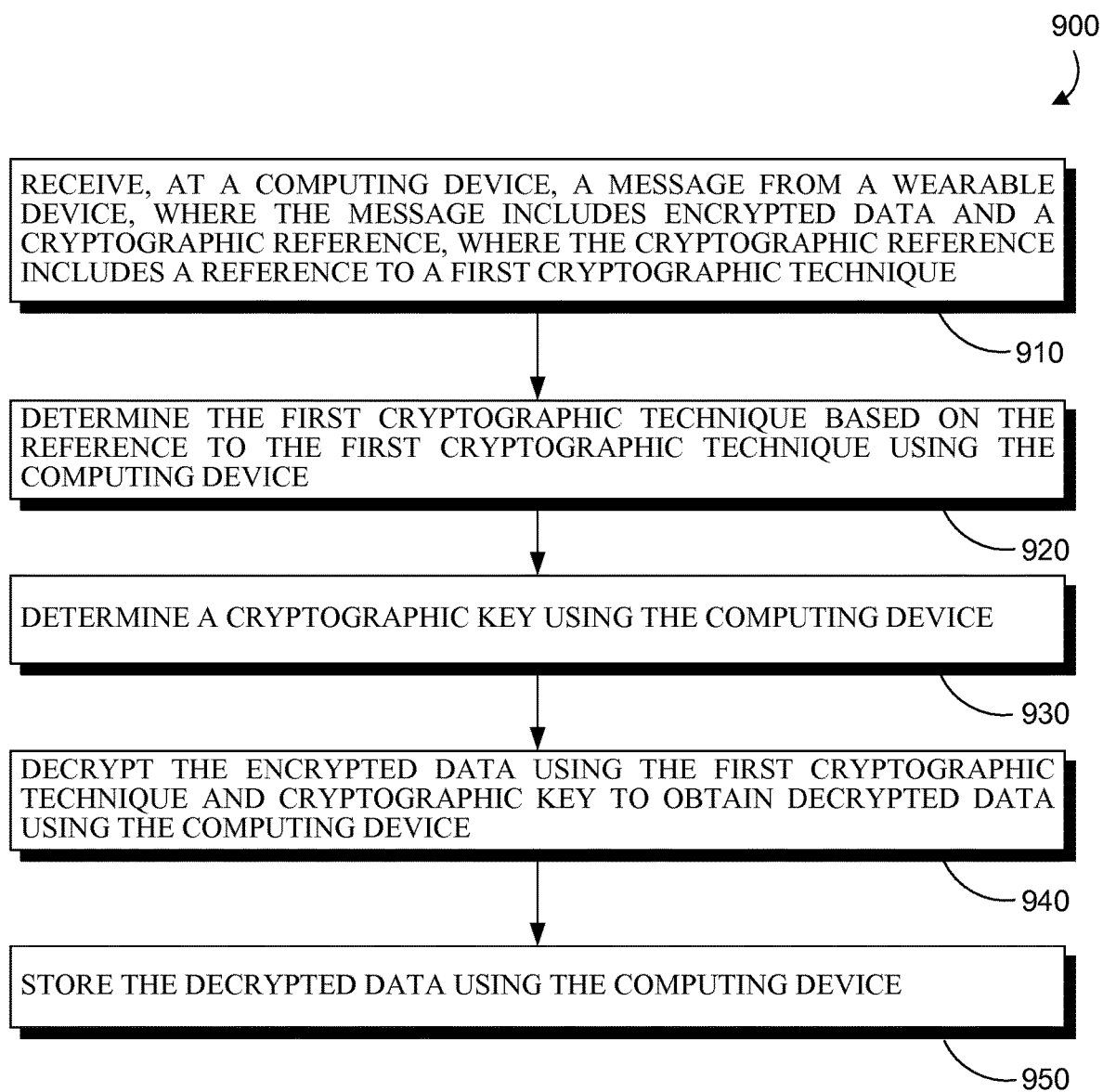
FIG. 9 is a flowchart of an example method of decrypting data at a computing device, in accordance with an example embodiment.

FIG. 9 is a flowchart of a method 900 storing data at a computing device. Example computing devices include, but are not limited to, herein-described computing device 800, wearable devices, associated computing devices, servers, and data sources.

Method 900 can begin at block 910, where a computing device can receive a message from a wearable device, where the message includes encrypted data and a cryptographic reference. The encrypted data can include, for example, physiological data of a wearer of a wearable device or other sensitive data. The cryptographic reference can include a reference to a first cryptographic technique, such as discussed in the context of at least FIGS. 11A-14B.

At block 920, the computing device can determine the first cryptographic technique based on the reference to the first cryptographic technique, such as discussed in the context of at least FIGS. 11A-14B.

At block 930, the computing device can determine a cryptographic key, such as discussed in the context of at least FIGS. 11A-14B. In some examples, the cryptographic reference includes a reference to the cryptographic key and the computing device can use the reference to the cryptographic key to obtain the cryptographic key. In some examples, the cryptographic reference includes a plurality of data items and the computing device can form the cryptographic key by applying a plurality of operators to the plurality of data items. Other examples are possible as well.

At block 940, the computing device can decrypt the encrypted data using the first cryptographic technique and cryptographic key to obtain decrypted data, such as discussed in the context of at least FIGS. 11A-14B.

At block 950, the computing device can store the decrypted data using the computing device, such as discussed in the context of at least FIGS. 11A-14B.

Figure 10:
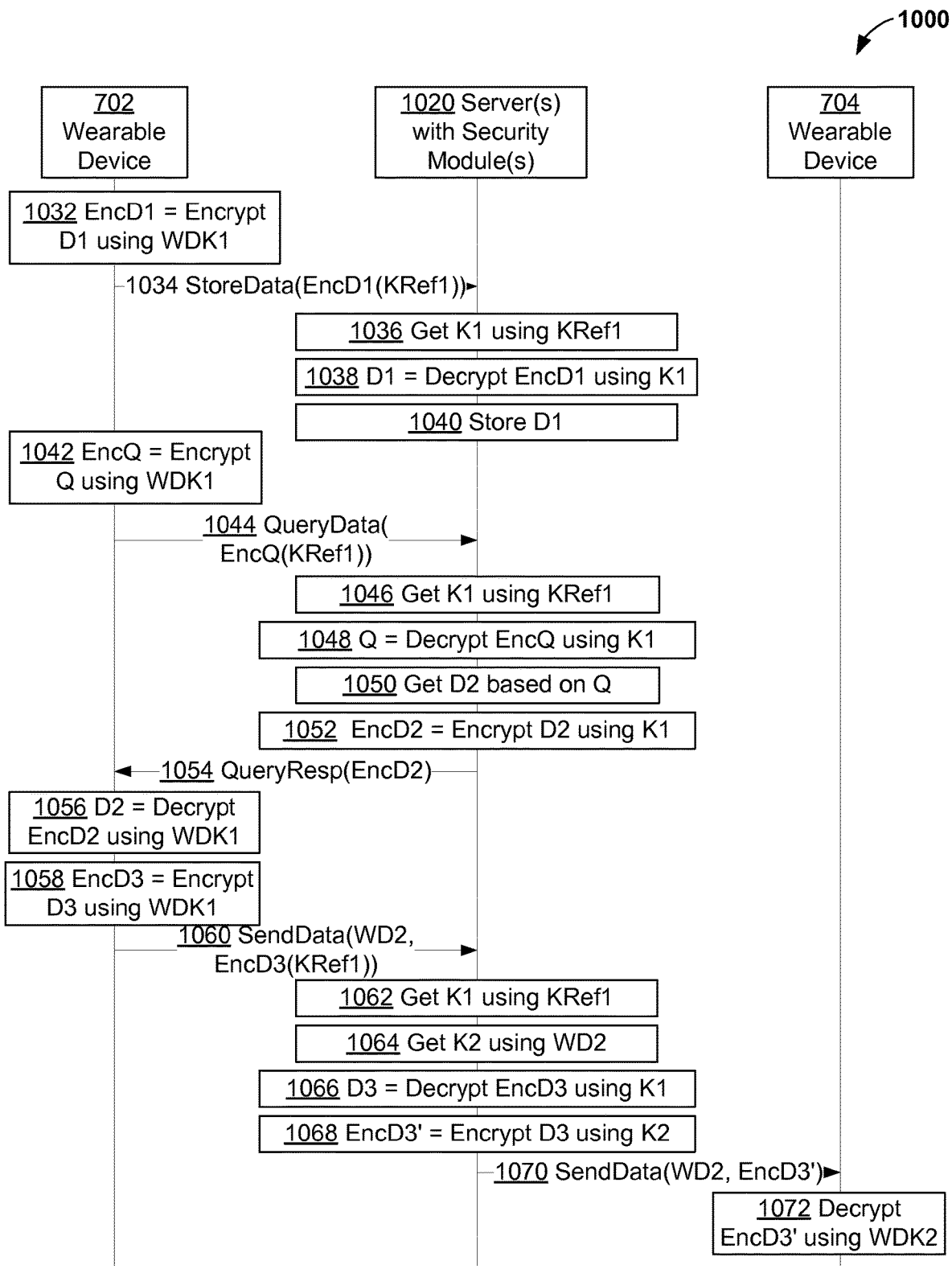
FIG. 10 depicts a scenario for communicating data between wearable devices and server(s) with security module(s), in accordance with an example embodiment.

Examples of Encrypting and Decrypting Wearable Device Data without Authentication FIG. 10 depicts an example scenario 1000 for communicating data between wearable devices 702, 704 and server(s) with security module(s) 1020, in accordance with an example embodiment. An example of server(s) with security module(s) 1020 is one or more servers associated with one or more hardware security modules. Scenario 1000 begins at block 1032 where wearable device 702 generates encrypted data EncD1 by encrypting data D1 using wearable device key WDK1. For example, wearable device key WDK1 can be a factory-installed key. Wearable device 702 then sends StoreData request 1034 to server(s) with security module(s) 1020, where the StoreData request includes encrypted data EncD1 and a reference KRef1 to wearable device key WDK1.

At block 1036, upon reception of StoreData request 1034, server(s) with security module(s) 1020 can, perhaps using the security module(s), derive or otherwise obtain a key K1 that is based on reference KRef1 provided as part of StoreData request 1034. Then, at block 1038, server(s) with security module(s) 1020 can, perhaps using the security module(s), decrypt encoded data EncD1 sent in StoreData request 1034 using obtained key K1 to get decrypted data D1. At block 1040, the decrypted data D1 and/or encoded data EncD1 can then be stored by server(s) with security module(s) 1020.

Scenario 1000 continues at block 1042, where wearable device 702 encrypts a query Q for data from server(s) with security module(s) 1020 using wearable device key WDK1. Wearable device 702 then sends QueryData message 1044 to server(s) with security module(s) 1020, where the QueryData message includes encrypted query EncQ and a reference KRef1 to wearable device key WDK1, where WDK1 can be a cryptographic key associated with wearable device 702. Upon reception of QueryData message 1044, server(s) with security module(s) 1020 can, perhaps using the security module(s), derive or otherwise obtain a cryptographic key K1 that is based on reference KRef1 provided as part of QueryData message 1044. Then, at block 1048, server(s) with security module(s) 1020 can, perhaps using the security module(s), decrypt encoded query EncQ sent QueryData message 1044 using obtained key K1 to get decrypted query Q. At block 1050, server(s) with security module(s) 1020 can, perhaps using the security module(s), obtain data associated with query Q; e.g., if query Q requests data related to a query term, then server(s) with security module(s) 1020 can obtain data D2 based on query Q; e.g., D2 is data related to the query term. At block 1052, server(s) with security module(s) 1020 can, perhaps using the security module(s), use key K1 to encrypt data D2 to get encrypted data EncD2 and send encrypted data EncD2 to wearable device 702 via QueryResp response message 1054. Upon reception of QueryResp message 1056, wearable device 702 can decrypt encrypted data EncD2 using wearable device key WDK1 to obtain and/or use data D2.

Scenario 1000 continues at block 1058, where wearable device 702 determines to communicate data D3 to wearable device 704, and encrypts data D3 using wearable device key WDK1. Wearable device 702 then sends SendData message 1060 to server(s) with security module(s) 1020, where the SendData message is addressed to wearable device 704 as "WD2" and includes encrypted data EncD3 and a reference KRef1 to wearable device key WDK1.

At block 1062, upon reception of SendData message 1060, server(s) with security module(s) 1020 can, perhaps using the security module(s), derive or otherwise obtain key K1 based on reference KRef1 provided as part of SendData message 1060. At block 1064, server(s) with security module(s) 1020 can, perhaps using the security module(s), derive or otherwise obtain a cryptographic key K2 for communicating with wearable device 704 based on address WD2 of wearable device 704. Then, at block 1066, server(s) with security module(s) 1020 can perhaps using the security module(s), decrypt encoded data EncD3 sent in SendData message using obtained key K1 to get decrypted data D3. At block 1068, server(s) with security module(s) 1020 can, perhaps using the security module(s), encrypt data D3 sent in SendData message using key K2, which is associated with wearable device 704, to obtain encrypted data EncD3' and then send SendData message 1070 addressed using address WD2 to wearable device 704. At block 1072, after receiving SendData message 1070, encoded data EncD3' can be decrypted using key WDK2 associated with wearable device 704 to obtain data D3. After wearable device 704 obtains data D3, scenario 1000 can end.

FIG. 11A shows a format for message 1100 that includes cryptographic reference 1110 and message data 1120, in accordance with an example embodiment. The format could be used for one or more of the messages shown in FIG. 10 and described above. For example, the format could be used for messages 1034, 1044, and 1060 sent from wearable device 702 to server 1020.

Message data 1120 can be encrypted using one or more cryptographic techniques referred to using cryptographic reference 1110. That is, cryptographic reference 1110 can include and/or refer to data for these one or more cryptographic techniques. For example, cryptographic reference 1110 can include reference to a cryptographic key, such as the KRef1 reference discussed above in the context of scenario 1000 of FIG. 10. Cryptographic reference 1110 can include and/or refer to other cryptographic data as well, such as seed data for initialing components related to cryptographic systems, data specifying one or more bit patterns used in encrypting and/or decrypting message data 1120, or other type(s) of cryptographic data. In some embodiments, cryptographic reference 1110 can use a cryptographic reference format such as shown in FIG. 11B. Many other formats for cryptographic references are possible as well, such as, but not limited to, a format for cryptographic multi-reference 1210 discussed below in the context of FIGS. 12A and 12B.

In other embodiments, cryptographic reference 1110 can be sent "in the clear"; i.e., unencrypted, while in other embodiments, cryptographic reference 1110 can be sent encrypted. If cryptographic reference 1110 is encrypted, cryptographic reference 1110 can be encrypted using a first cryptographic technique and can include and/or refer to data related to a second cryptographic technique used to encrypt message data 1120. In some particular embodiments, the first cryptographic technique used to encrypt cryptographic reference 1110 can be the same as the second cryptographic technique used to encrypt message data 1120; while in other particular embodiments, the first cryptographic technique can differ from the second cryptographic technique.

FIG. 11B shows a format for cryptographic reference 1110, in accordance with an example embodiment. Cryptographic reference 1110 can include type indicator 1130, type-specific reference 1132, and reference data 1134. In some embodiments, cryptographic reference 1110 can have more, less, and/or different information; e.g., size information, count information, information related to data integrity, such as a checksum information. Type indicator 1130 can provide information about a kind of cryptographic reference 1110, such as, but not limited to, a reference to a cryptographic algorithm, a reference to a pattern of data used for cryptography, a cryptographic key, or general data for use in cryptography.

Type-specific reference 1132 can include information that modifies or is otherwise related to the reference. For example, if type indicator 1130 refers to a group of cryptographic algorithms; e.g., the Data Encryption Standard (DES) group of algorithms, then type-specific reference 1132 can specify an algorithm in the class of algorithms; e.g., the Triple DES, G-DES, or DES-X algorithm in the DES group of algorithms, etc. As another example, if type indicator 1130 refers to general data, then type-specific reference 1132 can specify an offset, range of data, or other information related to the general data for accessing data; e.g., data in reference data 1134. In some embodiments, more than one type-specific reference 1132 can be provided as be as part of cryptographic reference 1110; e.g., if a range of reference data 1134 is to be selected, one type-specific reference 1132 can specify a beginning address or offset into reference data 1134 and another type-specific reference 1132 can specify an ending address or offset into reference data 1134.

Reference data 1134 can include information related to cryptographic reference 1110. As one example, if cryptographic reference 1110 is related to a cryptographic pattern, reference data 1134 can include data for the cryptographic pattern, a reference to the cryptographic pattern, or other data related to the cryptographic pattern. As another example, if cryptographic reference 1110 is related to a cryptographic key, reference data 1134 can include data for the cryptographic key, a reference to the cryptographic key, or other data related to the cryptographic key. Many other examples are possible as well.

FIG. 11C illustrates a format for a cryptographic type indicator 1130, in accordance with an example embodiment. Example types for cryptographic reference 1130 include:

cryptographic-algorithm type 1140 for a type of reference related to an algorithm used to encrypt and/or decrypt data, such as message data 1120, cryptographic-pattern type 1142 for a type of reference to related to a bit pattern or other type of pattern used to encrypt and/or decrypt data, cryptographic-key type 1144 for a type of reference to related to a cryptographic key used to encrypt and/or decrypt data, and cryptographic-general data type 1146 for a type of reference to related to general types of information related to encrypting and/or decrypting data.

Many other examples of types of references are possible as well.

FIG. 11D illustrates a format for cryptographic-algorithm type-specific reference 1150, in accordance with an example embodiment. Cryptographic-algorithm type-specific reference 1150 can include data to indicate a specific cryptographic algorithm to encode and/or decode data, such as message data 1120. For example, suppose four cryptographic algorithms are supported by a particular computing device: RSA and Elliptic Curve Cryptography (ECC), which are public-key algorithms; DES, which is a symmetric key algorithm; and Message Digest 5 (MD5), which is a cryptographic hash algorithm. Then, in this example:

cryptographic-algorithm type-specific reference 1150 can be assigned to algorithm 1 specifier 1152, or "01" as shown in FIG. 11D, to refer to the RSA algorithm, cryptographic-algorithm type-specific reference 1150 can be assigned to algorithm 2 specifier 1154, or "02" as shown in FIG. 11D, to refer to the ECC algorithm, cryptographic-algorithm type-specific reference 1150 can be assigned to "03" to refer to the DES algorithm, and cryptographic-algorithm type-specific reference 1150 can be assigned to "04" to refer to the MD5 algorithm.

As another example, cryptographic-algorithm type-specific reference 1150 can be assigned to "RSA" to refer to the RSA algorithm, "ECC" to refer to the ECC algorithm, "DES" to refer to the DES algorithm, and "MD5" to refer to the ECC algorithm. Many other examples of cryptographic algorithms and/or specific values can be used with respect to cryptographic-algorithm type-specific reference 1150 are possible as well.

FIG. 11E illustrates a format for cryptographic-pattern type-specific reference 1160, in accordance with an example embodiment. Cryptographic-pattern type-specific reference 1160 can include data to indicate a specific cryptographic pattern to encode and/or decode data, such as message data 1120. For example, suppose three 16-bit patterns are used: 0000000000000000, 1111111111111111, and 0101010101010101. Then, in this example:

cryptographic-pattern type-specific reference 1160 can be assigned to pattern 1 specifier 1162, or "01" as shown in FIG. 11D, to refer to the "0000000000000000" pattern, cryptographic-algorithm type-specific reference 1160 can be assigned to pattern 2 specifier 1164, or "02" as shown in FIG. 11D, to refer to the "1111111111111111" pattern, and cryptographic-algorithm type-specific reference 1160 can be assigned to "03", to refer to the "0101010101010101" pattern.

Many other examples of patterns and/or specific values can be used with respect to cryptographic-algorithm pattern-specific reference 1160 are possible as well.

FIG. 12A shows a format for message 1210 with a cryptographic multi-reference 1220, in accordance with an example embodiment. Message data 1220 can be encrypted using one or more cryptographic techniques referred to using cryptographic multi-reference 1210.

FIG. 12B shows a format for cryptographic multi-reference 1210, in accordance with an example embodiment. Cryptographic multi-reference 1210 can include a reference count (RC) 1230 and references 1, 2 . . . RC. In some embodiments, cryptographic multi-reference 1210 can have more, less, and/or different information; e.g., size information, count information, information related to data integrity, such as a checksum information. In other embodiments, cryptographic multi-reference 1210 can have a reference count RC that is less than three; e.g., cryptographic multi-reference 1210 can have only one or two references.

Reference count 1230 can specify a number of references. Each reference in cryptographic multi-reference 1210 can represent the information included in cryptographic reference 1110 discussed above with respect to FIG. 11B. Each reference can include a size, a type indicator, a type-specific reference, and data for the reference. A reference size can be a number of bytes, or other measure of data storage, required to store the reference. A reference type indicator can be a type indicator, such as type indicator 1130 discussed above with respect to FIGS. 11B and 11C. A reference type-specific reference can be a type-specific reference, such as type-specific reference 1132, 1150, 1160 discussed above with respect to FIGS. 11B, 11D, and 11E. Data for the reference can include information related to the reference, such as reference data 1134 discussed above in the context of FIG. 11B. In some embodiments, a reference can have more, less, and/or different data than shown in FIG. 12B.

For example, FIG. 12B shows that reference 1 includes reference 1 size 1240, reference 1 type indicator 1242, reference 1 type-specific reference 1244, and reference 1 data 1246. Similarly, reference 2 includes reference 2 size 1250, reference 2 type indicator 1252, reference 2 type-specific reference 1254, and reference 2 data 1256, and so on, until reaching the $RC^{th}$ reference, which includes reference RC size 1260, reference RC type indicator 1262, reference RC type-specific reference 1264, and reference RC data 1266.

In some examples, cryptographic multi-reference 1210 can specify one cryptographic technique for encrypting and/or decrypting message data 1220. In other examples, cryptographic multi-reference 1210 can specify multiple cryptographic techniques for encrypting and/or decrypting message data 1220. In these examples, encryption or decryption can be performed using the cryptographic techniques in the order specified in cryptographic multi-reference 1210; e.g., if reference 1 specifies cryptographic technique a and reference 2 specifies cryptographic technique 8, then cryptographic technique a would first be applied to message data 1220 and then cryptographic technique 8 would be applied to message data 1220. As another example, if reference 1 specifies cryptographic technique 8 and reference 2 specifies cryptographic technique a, then cryptographic technique B would first be applied to message data 1220 and then cryptographic technique a would be applied to message data 1220.

Figure 13:
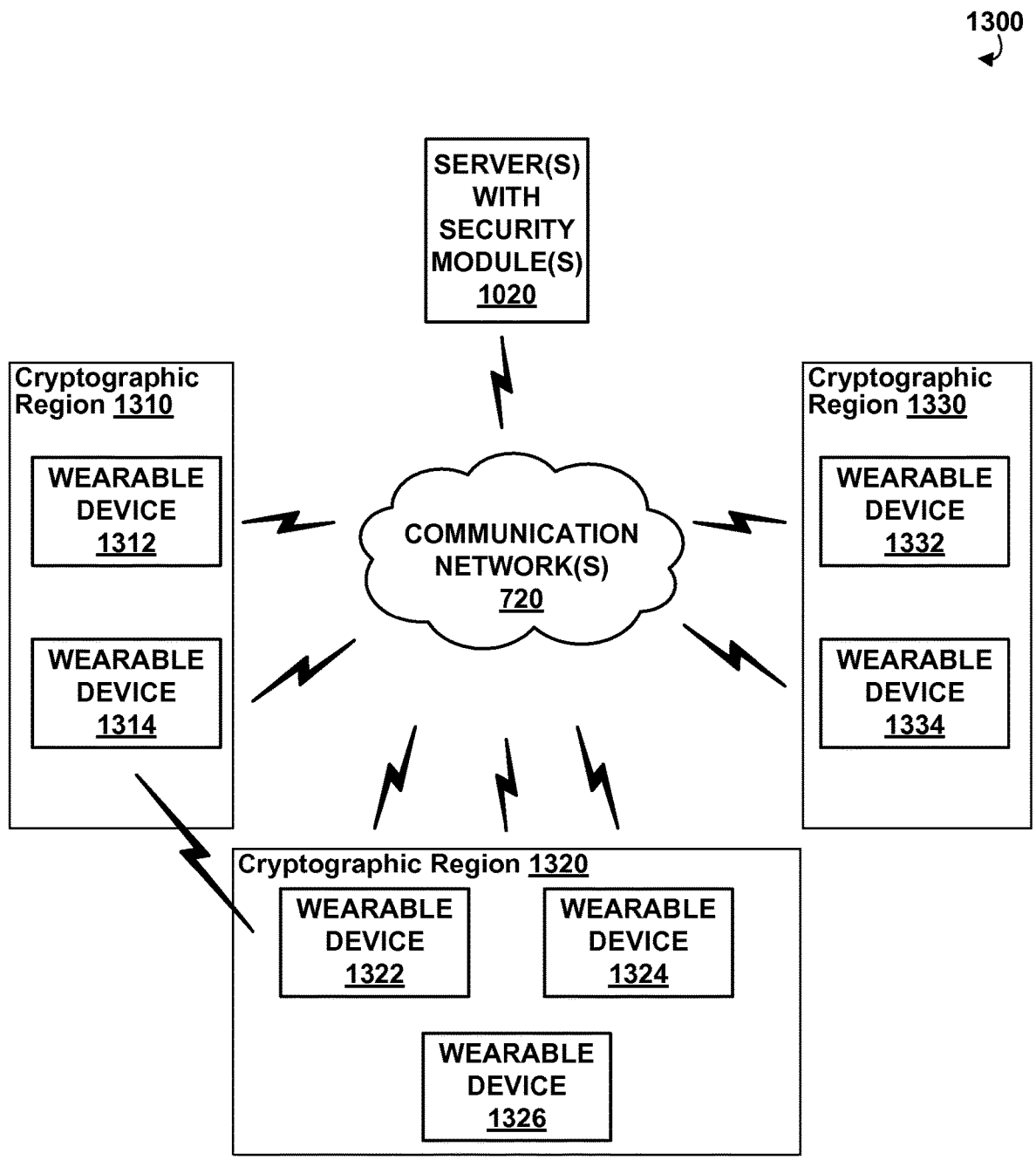
FIG. 13 is a block diagram of an example system with a plurality of wearable devices in cryptographic regions in communication with server(s) with security module(s), in accordance with an example embodiment.

FIG. 13 is a block diagram of an example system 1300 with a plurality of wearable devices 1312, 1314, 1322, 1324, 1326, 1332, 1334 in three cryptographic regions 1310, 1320, 1330 in communication with server(s) with security module(s) 1020, in accordance with an example embodiment. In particular, cryptographic region 1310 includes wearable devices 1312, 1314; cryptographic region 1320 includes wearable devices 1322, 1324, 1326, and cryptographic region 1320 includes wearable devices 1332, 1334. Each wearable device 1312, 1314, 1322, 1324, 1326, 1332, 1334 is configured to communicate at least with server(s) with security module(s) 1020 via network(s) 720.

In some cases, wearable devices can be configured to communicate directly; that is, without contacting intermediate device(s), such as server(s) with security module(s) 1020. For example, FIG. 13 indicates that wearable device 1314, can communicate directly with 1 wearable device 1322. In other cases, wearable devices can only communicate with each other via intermediate device(s), such as server(s) with security module(s) 1020. In particular of these cases, the intermediate device(s) may enforce a policy that wearable devices within a cryptographic region can only communicate with other wearable devices in the same cryptographic region.

In yet other cases, cryptographic regions can be hierarchical; e.g., a lower-level cryptographic region can use only one cryptographic algorithm CA1, and an upper-level cryptographic region can use two cryptographic algorithms CA1 and CA2, where only devices in the upper-level cryptographic region have access to cryptographic algorithm CA2. Then, a wearable device in the upper-level cryptographic region can use cryptographic algorithm CA2 to secure data from decryption by wearable devices in the lower-level cryptographic region.

A common set of cryptographic policies can be followed within a cryptographic region. For example, within a cryptographic region, a predetermined number of cryptographic algorithms can be used, one or more choices for patterns can be used, cryptographic keys can have one or more predetermined lengths, and so on. These policies can be implemented, at least in part, by ensuring that devices within a cryptographic region can carry out (at least part of) the common set of cryptographic policies for the cryptographic region. That is, each device can be configured with software and/or hardware used to carry out (at least some of) the cryptographic algorithms available for use within the cryptographic region, to utilize cryptographic key(s) and/or pattern(s) of at least the minimum length(s) for the cryptographic algorithms available for use, and to implement other cryptographic policies for the cryptographic region.

The cryptographic policies for the cryptographic region can be implemented, in part, based on choices for cryptographic reference data. The choices for cryptographic reference data within the cryptographic region can be based on the implemented cryptographic algorithms, patterns, and other hardware and/or software capabilities related to encryption that can be used by at least some devices within the cryptographic region. For example, if the cryptographic region utilizes NCA different cryptographic algorithms, NCA>0, then at most NCA different cryptographic-algorithm type values might be used within the cryptographic region. As another example, if the cryptographic region limits cryptographic key lengths to a maximum key length MKL, MKL>0, then data sizes for cryptographic-key type references within the cryptographic region can have limits based on the value of MKL. Many other selections for cryptographic reference data within a cryptographic region are possible as well.

Figure 14A:
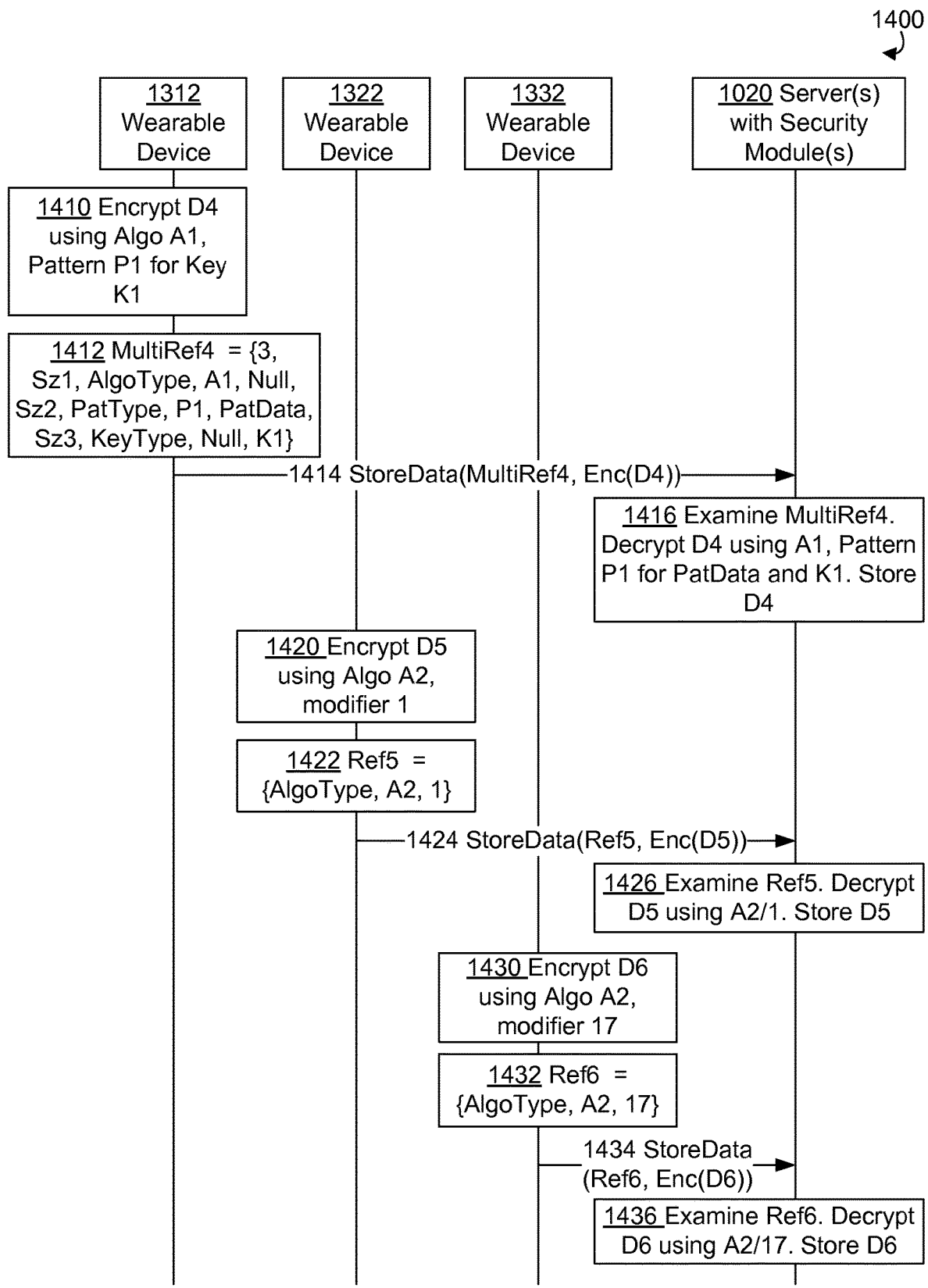
FIGS. 14A and 14B depicts another scenario for communicating data between wearable devices and server(s) with security module(s), in accordance with an example embodiment.
Figure 14B:
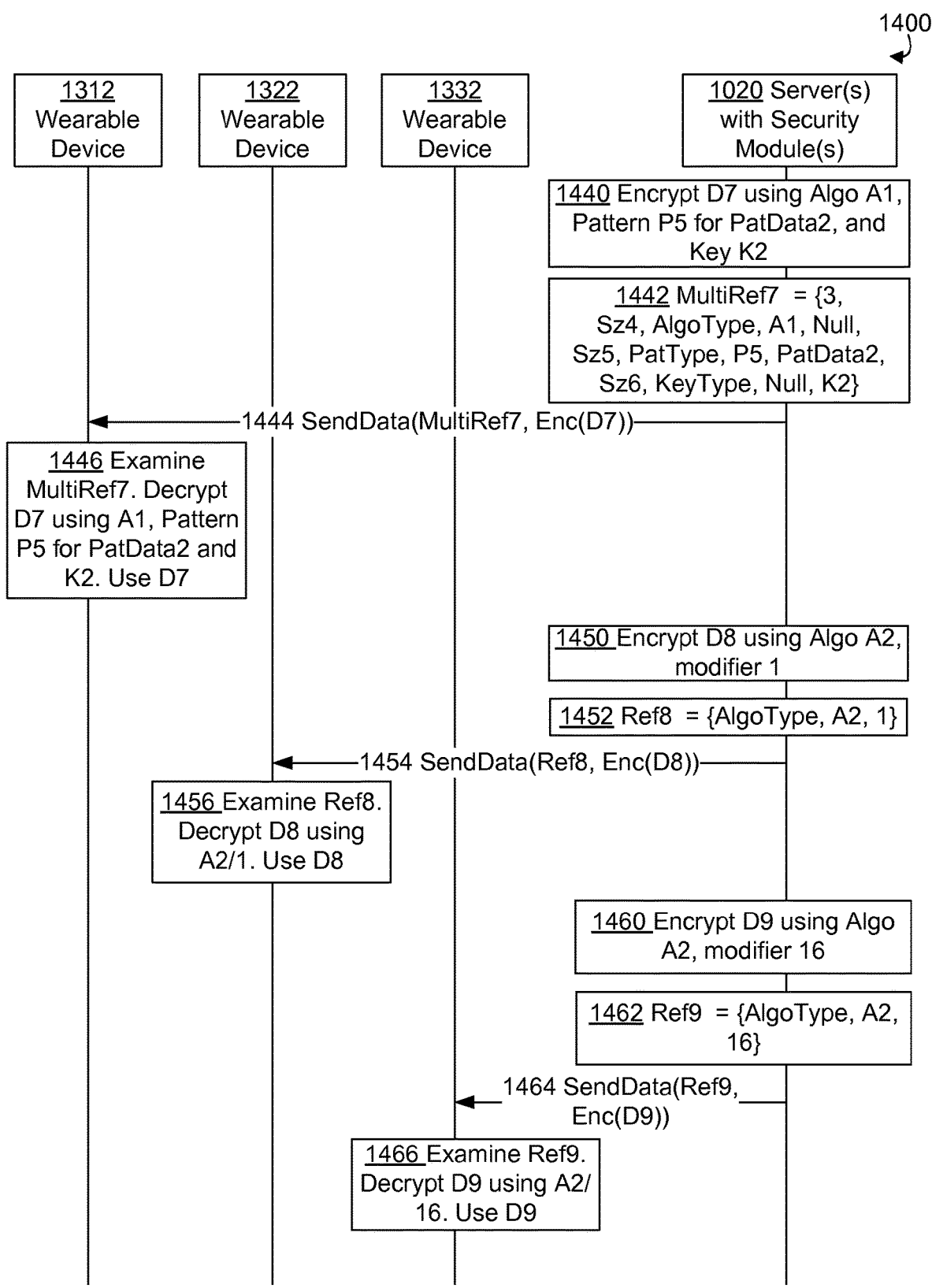

FIGS. 14A and 14B depicts scenario 1400 for communicating data between wearable devices 1312, 1322, 1332 and server(s) with security module(s) 1020, in accordance with an example embodiment. As indicated in FIG. 13, wearable device 1312 is in cryptographic region 1310, wearable device 1322 is in cryptographic region 1320, and wearable device 1332 is in cryptographic region 1330. In cryptographic region 1310, cryptographic multi-references are used to communicate cryptographic reference data, while cryptographic regions 1320 and 1330 can utilize cryptographic references or cryptographic multi-references. In cryptographic region 1310, cryptographic algorithms A1 and A2 are supported, with the policy that algorithm A1 is to be used by default along with one of five possible patterns of data can be used select portions of key data for the selected algorithm. In cryptographic region 1320, cryptographic algorithms A1 and A2 are supported; with the policy that cryptographic algorithm A2 with modifier 1 is to be used by default by both wearable devices and servers. And, in cryptographic region 1330, only cryptographic algorithm A2 is supported, with the policy that algorithm A2 with modifier 16 is to be used by default by servers to encrypt data, and algorithm A2 with modifier 17 is to be used by default by wearable devices to encrypt data. In other scenarios, other policy/data choices are possible for cryptographic regions.

Scenario 140 begins at block 1410, where wearable device 1312 utilizes cryptographic algorithm A1, pattern P1, pattern data PatData and key data K1 to encrypt data D4. Data D4 can be data that is deemed to be sensitive to wearable device 1312; e.g., physiological data for a wearer of wearable device 1312, financial data related to the wearer, confidential information, and/or other type(s) of sensitive data.

At block 1412, wearable computing device 1312 generates cryptographic multi-reference "MultiRef4" with a reference count of "3" as indicated in FIG. 14A. The first reference of MultiRef4 has a size of Sz1, is related to a cryptographic algorithm type as indicated using "AlgoType" in FIG. 14A, with a type-specific indicator referring to cryptographic algorithm "A1", and with "Null", or unutilized, reference data. The second reference of MultiRef4 has a size of Sz2, is related to a cryptographic-pattern type as indicated using "PatType" in FIG. 14A, with a type-specific indicator referring to pattern "P1", and "PatData" stored as reference data. That is, the second reference of MultiRef4 indicates that pattern P1 is to be applied to PatData to obtain a pattern of data. The third reference of MultiRef4 has a size of Sz3, is related to a cryptographic-key type as indicated using "KeyType" in FIG. 14A without a type-specific indicator as indicated with a "Null" value and with "K1" stored as reference data. In combination, MultiRef4 can indicate that cryptographic algorithm A1 is to be used based on a cryptographic key KK formed by selection of part of K1 selected using pattern P1 applied to PatData. For example, cryptographic key KK=K1 OP1 (P1 OP2 PatData), where OP1 and OP2 are bit operators, such as, but not limited to, bitwise-AND, bitwise-OR, bitwise-NAND, bitwise-NOR, bitwise-NOT, and bitwise-XOR operators. Other operators than bitwise operators and many other combinations of K1, P1, and PatData can be used to encrypt and/or decrypt data as well.

After generating cryptographic multi-reference MultiRef4, wearable device 1312 can generate and send StoreData message 1414 with MultiRef4 and encrypted data "Enc(D4)", representing data D4, to server(s) with security module(s) 1020.

At block 1416, server(s) with security module(s) 1020 can receive StoreData message 1414. Then, server(s) with security module(s) 1020 can use cryptographic multi-reference MultiRef4 to determine that cryptographic algorithm A1 was used to encrypt data Enc(D4) based on a selection of K1 selected using pattern P1 applied to PatData. Server(s) with security module(s) 1020 can use cryptographic algorithm A1 or a related decryption algorithm along with P1, PatData, and K1 to decrypt data Enc(D4) and obtain data D4; e.g., server(s) with security module(s) 1020 can use the same or related combinations of operations applied to P1, PatData, and K1 as carried out by wearable device 1312 while encrypting data D4. After obtaining decrypted data D4 from Enc(D4), server(s) with security module(s) 1020 can store decrypted data D4.

At block 1420 of scenario 1400, wearable device 1322 can utilize cryptographic algorithm A2 having a modifier of 1 to encrypt data D5. Data D5 can be data that is deemed to be sensitive to wearable device 1322 such as discussed above in the context of data D4 of at least block 1410.

At block 1422, wearable computing device 1322 generates cryptographic reference "Ref5" as indicated in FIG. 14A. Ref5 can indicate that cryptographic algorithm A2 with modifier 1 was used to encrypt data; e.g., data D5. After generating cryptographic reference Ref5, wearable device 1322 can generate and send StoreData message 1424 with Ref5 and encrypted data "Enc(D5)", representing data D5, to server(s) with security module(s) 1020.

At block 1426, server(s) with security module(s) 1020 can receive StoreData message 1424. Then, server(s) with security module(s) 1020 can use cryptographic reference Ref5 to determine that cryptographic algorithm A2 with modifier 1 was used to encrypt data Enc(D5). Server(s) with security module(s) 1020 can use cryptographic algorithm A2 modifier 1, or a related decryption algorithm, to decrypt data Enc(D5) to obtain decrypted data D5. After obtaining D5, server(s) with security module(s) 1020 can store decrypted data D5.

At block 1430 of scenario 1400, wearable device 1332 utilizes cryptographic algorithm A2 modifier 17 to encrypt data D6. Data D6 can be data that is deemed to be sensitive to wearable device 1332 such as discussed above in the context of data D4 of at least block 1410.

At block 1432, wearable computing device 1332 generates cryptographic reference "Ref6" as indicated in FIG. 14A. Ref6 can indicate that cryptographic algorithm A2 with modifier 17 was used to encrypt data; e.g., data D6. After generating cryptographic reference Ref6, wearable device 1332 can generate and send StoreData message 1434 with Ref6 and encrypted data "Enc(D6)", representing data D6, to server(s) with security module(s) 1020.

At block 1436, server(s) with security module(s) 1020 can receive StoreData message 1434. Then, server(s) with security module(s) 1020 can use cryptographic reference Ref6 to determine that cryptographic algorithm A2 with modifier 17 was used to encrypt data Enc(D6). Server(s) with security module(s) 1020 can use cryptographic algorithm A2 modifier 17, or a related decryption algorithm, to decrypt data Enc(D6) to obtain decrypted data D6. After obtaining D6, server(s) with security module(s) 1020 can store decrypted data D6.

Turning to FIG. 14B, scenario 1400 can continue at block 1440, where server(s) with security module(s) 1020 utilizes cryptographic algorithm A1, pattern P5, pattern data PatData2 and key data K2 to encrypt data D7. Data D7 can be data for wearable device 1312 to be provided in response to a query or other request for data (query/request not shown in FIG. 14B). Data D7 can be deemed to be sensitive to wearable device 1312 such as discussed above in the context of data D4 of at least block 1410, At block 1442, server(s) with security module(s) 1020 generates cryptographic multi-reference "MultiRef7" with a reference count of "3" as indicated in FIG. 14B. The first reference of MultiRef7 has a size of Sz4 and is related to a cryptographic algorithm "A1" with "Null" reference data. The second reference of MultiRef7 has a size of Sz5 and is related to a cryptographic pattern "P5" with "PatData2"

stored as reference data. That is, the second reference of MultiRef7 indicates that pattern P5 is to be applied to PatData2 to obtain a pattern of data. The third reference of MultiRef7 has a size of Sz6 and is related to a cryptographic key without a type-specific indicator and with "K2" stored as reference data. In combination, MultiRef7 can indicate that cryptographic algorithm A1 is to be used based on a cryptographic key KK2 formed by selection of K2 selected using pattern P5 applied to PatData2, such as discussed above in the context of cryptographic key KK of block 1412 of FIG. 14A.

After generating cryptographic multi-reference MultiRef7, server(s) with security module(s) 1020 can generate and send SendData message 1444 with MultiRef7 and encrypted data "Enc(D7)", representing data D7, to wearable device 1312.

At block 1446, wearable device 1312 can receive SendData message 1444. Then, wearable device 1312 can use cryptographic multi-reference MultiRef7 to determine that cryptographic algorithm A1 was used to encrypt data Enc(D7) based on a selection of K2 selected using pattern P2 applied to PatData2. Server(s) with security module(s) 1020 can use cryptographic algorithm A1 or a related decryption algorithm along with P2, PatData2, and K2 to decrypt data Enc(D7) and obtain data D7; e.g., server(s) with security module(s) 1020 can use the same or related combinations of operations applied to P2, PatData2, and K2 as carried out by server(s) with security module(s) 1020 while encrypting data D7. After obtaining decrypted data D7 from Enc(D7), wearable device 1312 can use decrypted data D7; e.g., display part or all of D7, use part or all of D7 in a software application, store D7.

At block 1450 of scenario 1400, server(s) with security module(s) 1020 can utilize cryptographic algorithm A2 having a modifier of 1 to encrypt data D8. Data D8 can be data for wearable device 1322 to be sent in response to a query or other request for data (query/request not shown in FIG. 14B). Data D8 can be deemed to be sensitive to wearable device 1322 such as discussed above in the context of data D4 of at least block 1410.

At block 1452, server(s) with security module(s) 1020 generates cryptographic reference "Ref8" as indicated in FIG. 14B. Ref8 can indicate that cryptographic algorithm A2 with modifier 1 was used to encrypt data; e.g., data D8. After generating cryptographic reference Ref8, server(s) with security module(s) 1020 can generate and send SendData message 1454 with Ref8 and encrypted data "Enc(D8)", representing data D8, to wearable device 1322.

At block 1456, wearable device 1322 can receive SendData message 1454. Then, wearable device 1322 can use cryptographic reference Ref8 to determine that cryptographic algorithm A2 with modifier 1 was used to encrypt data Enc(D8). Wearable device 1322 can use cryptographic algorithm A2 modifier 1, or a related decryption algorithm, to decrypt data Enc(D8) to obtain decrypted data D8. After obtaining D8, wearable device 1322 can use decrypted data D8; e.g., display part or all of D8, use part or all of D8 in a software application store D8.

At block 1460 of scenario 1400, server(s) with security module(s) 1020 can utilize cryptographic algorithm A2 modifier 16 to encrypt data D9. Data D9 can be data for wearable device 1332 to be sent in response to a query or other request for data (query/request not shown in FIG. 14B). Data D9 can be deemed to be sensitive to wearable device 1332, such as discussed above in the context of data D4 of at least block 1410.

At block 1462, server(s) with security module(s) 1020 generates cryptographic reference "Ref9" as indicated in FIG. 14B. Ref9 can indicate that cryptographic algorithm A2 with modifier 16 was used to encrypt data; e.g., data D9. After generating cryptographic reference Ref9, server(s) with security module(s) 1020 can generate and send SendData message 1464 with Ref9 and encrypted data "Enc(D9)", representing data D9, to wearable device 1332.

At block 1466, wearable device 1332 can receive SendData message 1464. Then, wearable device 1332 can use cryptographic reference Ref9 to determine that cryptographic algorithm A2 with modifier 16 was used to encrypt data Enc(D9). Wearable device 1332 can use cryptographic algorithm A2 modifier 17, or a related decryption algorithm, to decrypt data Enc(D9) to obtain decrypted data D9. After obtaining D9, wearable device 1332 can use decrypted data D9; e.g., display part or all of D9, use part or all of D9 in a software application store D9.

After block 1466, scenario 1400 can end. Note that in scenario 1400, authentication such as username/password or biometric data authentication was not utilized. That is, in scenario 1400, data can be communicated by wearable devices and servers in encrypted form, and later decrypted, without requiring authentication of entities related to either a wearable device or a server.

Where example embodiments involve information related to a person or a device of a person, some embodiments may include privacy controls. Such privacy controls may include, at least, anonymization of device identifiers, transparency and user controls, including functionality that would enable users to modify or delete information relating to the user's use of a product.

Further, in situations in where embodiments discussed herein collect personal information about users, or may make use of personal information, the users may be provided with an opportunity to control whether programs or features collect user information (e.g., information about a user's physiology, medical history, social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for provided for explanatory purposes and are not intended to be limiting, with the true scope being indicated by the following claims.

That which is claimed is:

1. A method, comprising:
receiving, at a computing device, a message from a wearable device, wherein the message comprises encrypted data and a cryptographic reference, wherein the encrypted data is encrypted using a first cryptographic technique and comprises physiological data of a wearer of the wearable device, wherein the cryptographic reference includes reference data and a reference to the first cryptographic technique, and wherein the cryptographic reference is encrypted using a second cryptographic technique different from the first cryptographic technique;
decrypting the cryptographic reference using the second cryptographic technique to obtain the reference to the first cryptographic technique using the computing device;
determining the first cryptographic technique based on the reference to the first cryptographic technique using the computing device;
determining a cryptographic key based on the reference data using the computing device;
decrypting the encrypted data using the first cryptographic technique and the cryptographic key to obtain decrypted data using the computing device; and
storing the decrypted data using the computing device.

2. The method of claim 1, wherein the reference data includes a reference to the cryptographic key, and wherein determining the cryptographic key based on the reference data using the computing device comprises using the reference to the cryptographic key to obtain the cryptographic key.

3. The method of claim 1, wherein the reference data comprises a plurality of data items, and wherein determining the cryptographic key based on the reference data using the computing device comprises forming the cryptographic key by applying a plurality of operators to the plurality of data items.

4. The method of claim 1, further comprising:
receiving, at the computing device, a request from a second computing device for data stored on the computing device;
obtaining the requested data stored on the computing device;
encrypting the requested data using an additional cryptographic technique; and
sending a second message from the computing device to the second computing device, wherein the second message comprises the encrypted requested data and a second cryptographic reference, wherein the second cryptographic reference includes a reference to the additional cryptographic technique.

5. The method of claim 4, wherein the first cryptographic technique differs from the additional cryptographic technique.

6. The method of claim 1, further comprising:
receiving, at the computing device, an encrypted query from the wearable device;
determining a query by decrypting the encrypted query using the first cryptographic technique and the cryptographic key;
determining a response based on the query;
encrypting the response using the first cryptographic technique and the cryptographic key; and
sending the encrypted response from the computing device to the wearable device.

7. The method of claim 6, wherein the query comprises a request for data stored on the computing device, and wherein the encrypted response comprises the requested data.

8. The method of claim 1, wherein the computing device is associated with a plurality of cryptographic regions that include a first cryptographic region and a second cryptographic region, wherein the first cryptographic region is associated with first cryptographic reference data, the first cryptographic reference data comprising a first cryptographic-algorithm type and a first cryptographic-algorithm type-specific reference, wherein the second cryptographic region is associated with second cryptographic reference data, the second cryptographic reference data comprising a second cryptographic-algorithm type and a second cryptographic-algorithm type-specific reference, and wherein the first cryptographic reference data differs from the second cryptographic reference data.

9. A computing device, comprising:
a processor; and
a non-transitory computer readable medium comprising processor-executable instructions that when executed by the processor cause the computing device to:
receive a message from a wearable device, wherein the message comprises encrypted data and a cryptographic reference, wherein the encrypted data is encrypted using a first cryptographic technique and comprises physiological data of a wearer of the wearable device, wherein the cryptographic reference includes reference data and a reference to the first cryptographic technique, and wherein the cryptographic reference is encrypted using a second cryptographic technique different from the first cryptographic technique;
decrypt the cryptographic reference using the second cryptographic technique to obtain the reference to the first cryptographic technique using the computing device;
determine the first cryptographic technique based on the reference to the first cryptographic technique;
determine a cryptographic key based on the reference data;
decrypt the encrypted data using the first cryptographic technique and the cryptographic key to obtain decrypted data; and
store storing the decrypted data.

10. The computing device of claim 9, wherein the reference data includes a reference to the cryptographic key, and the processor-executable instructions further comprise processor-executable instructions to cause the processor to use the reference to the cryptographic key to obtain the cryptographic key.

11. The computing device of claim 9, wherein the reference data comprises a plurality of data items, and wherein the processor-executable instructions further comprise processor-executable instructions to cause the processor to form the cryptographic key by applying a plurality of operators to the plurality of data items.

12. The computing device of claim 9, wherein the processor-executable instructions further comprise processor-executable instructions to cause the processor to:
receive a request from a second computing device for data stored on the computing device;
obtain the requested data stored on the computing device;
encrypt the requested data using an additional cryptographic technique; and
send a second message from the computing device to the second computing device, wherein the second message comprises the encrypted requested data and a second cryptographic reference, wherein the second cryptographic reference includes a reference to the additional cryptographic technique.

13. The computing device of claim 12, wherein the first cryptographic technique differs from the additional cryptographic technique.

14. The computing device of claim 9, wherein the processor-executable instructions further comprise processor-executable instructions to cause the processor to:
receive an encrypted query from the wearable device;
determine a query by decrypting the encrypted query using the first cryptographic technique and the cryptographic key;
determine a response based on the query;
encrypt the response using the first cryptographic technique and the cryptographic key; and
send the encrypted response from the computing device to the wearable device.

15. The computing device of claim 14, wherein the query comprises a request for data stored on the computing device, and wherein the encrypted response comprises the requested data.

16. The computing device of claim 9, wherein the computing device is associated with a plurality of cryptographic regions that include a first cryptographic region and a second cryptographic region, wherein the first cryptographic region is associated with first cryptographic reference data, the first cryptographic reference data comprising a first cryptographic-algorithm type and a first cryptographic-algorithm type-specific reference, wherein the second cryptographic region is associated with second cryptographic reference data, the second cryptographic reference data comprising a second cryptographic-algorithm type and a second cryptographic-algorithm type-specific reference, and wherein the first cryptographic reference data differs from the second cryptographic reference data.

17. A non-transitory computer readable medium configured to store processor-executable instructions that when executed by a processor of a computing device, cause the computing device to:
receive a message from a wearable device, wherein the message comprises encrypted data and a cryptographic reference, wherein the encrypted data is encrypted using a first cryptographic technique and comprises physiological data of a wearer of the wearable device, wherein the cryptographic reference comprises reference data and a reference to the first cryptographic technique, and wherein the cryptographic reference is encrypted using a second cryptographic technique different from the first cryptographic technique;
decrypt the cryptographic reference using the second cryptographic technique to obtain the reference to the first cryptographic technique using the computing device;
determine the first cryptographic technique based on the reference to the first cryptographic technique;
determine a cryptographic key based on the reference data;
decrypt the encrypted data using the first cryptographic technique and the cryptographic key to obtain decrypted data; and
store the decrypted data.

18. The non-transitory computer readable medium of claim 17, further comprising processor-executable instructions that when executed by a processor of a computing device, cause the computing device to:
encrypt second data using an additional cryptographic technique;
generate a second message that comprises the encrypted second data and a second cryptographic reference, wherein the second cryptographic reference comprises a reference to the additional cryptographic technique; and
send the second message.

19. The non-transitory computer readable medium of claim 18, wherein the first cryptographic technique differs from the additional cryptographic technique.

20. The non-transitory computer readable medium of claim 17, wherein the reference data includes a reference to the cryptographic key, and further comprising processor-executable instructions that when executed by a processor of a computing device, cause the computing device to obtain the cryptographic key using the reference to the cryptographic key.

\* \* \* \* \*